(12) United States Patent
Oikawa et al.

(10) Patent No.: US 11,170,259 B2
(45) Date of Patent: Nov. 9, 2021

(54) MACHINE LEARNING DEVICE, DATA PROCESSING SYSTEM, PRINTING SYSTEM, MACHINE LEARNING METHOD, AND DATA PROCESSING METHOD

(71) Applicant: OKI ELECTRIC INDUSTRY CO., LTD., Tokyo (JP)

(72) Inventors: Masashi Oikawa, Tokyo (JP); Kunio Kanai, Tokyo (JP); Atsushi Kitahara, Tokyo (JP); Toshiaki Takamune, Tokyo (JP)

(73) Assignee: OKI ELECTRIC INDUSTRY CO., LTD., Tokyo (JP)

( * ) Notice: Subject to any disclaimer, the term of this patent is extended or adjusted under 35 U.S.C. 154(b) by 96 days.

(21) Appl. No.: 16/657,251

(22) Filed: Oct. 18, 2019

(65) Prior Publication Data
US 2020/0134373 A1 Apr. 30, 2020

(30) Foreign Application Priority Data

Oct. 29, 2018 (JP) .............................. JP2018-203220
Aug. 29, 2019 (JP) .............................. JP2019-157373

(51) Int. Cl.
*G06K 9/62* (2006.01)
*G06F 3/12* (2006.01)
*G06N 20/00* (2019.01)

(52) U.S. Cl.
CPC ......... *G06K 9/6256* (2013.01); *G06F 3/1231* (2013.01); *G06F 3/1232* (2013.01); *G06F 3/1235* (2013.01); *G06K 9/6211* (2013.01); *G06N 20/00* (2019.01)

(58) Field of Classification Search
None
See application file for complete search history.

(56) References Cited

U.S. PATENT DOCUMENTS

2020/0013158 A1* 1/2020 Asai ..................... G06T 7/0002
2021/0031507 A1* 2/2021 Haik ..................... G06T 7/001

FOREIGN PATENT DOCUMENTS

JP  09-329994 A  12/1997

* cited by examiner

*Primary Examiner* — Dov Popovici
(74) *Attorney, Agent, or Firm* — Sanitch Schwarze Belisario & Nadel LLP

(57) ABSTRACT

A machine learning device includes a state variable acquiring section, a teaching data acquiring section, and a learned model generating section. The state variable acquiring section acquires, as state variables: feature information that is information regarding a feature of an actual printed matter on which printing has been actually performed by an image forming apparatus; medium information that is information regarding a print medium used in the actual printed matter; and first control information that is information regarding control performed when the actual printed matter has been outputted. The teaching data acquiring section acquires, as teaching data, second control information that is information regarding control that causes the feature information to fall within a predetermined threshold. The learned model generating section generates a learned model by performing machine learning on the basis of the pieces of information acquired by the state variable acquiring section and the teaching data.

15 Claims, 12 Drawing Sheets

MACHINE LEARNING DEVICE, DATA PROCESSING SYSTEM, PRINTING SYSTEM, MACHINE LEARNING METHOD, AND DATA PROCESSING METHOD

CROSS REFERENCE TO RELATED APPLICATIONS

The present application claims priority from Japanese Patent Application No. 2018-203220 filed on Oct. 29, 2018 and Japanese Patent Application No. 2019-157373 filed on Aug. 29, 2019 the entire contents of each which are hereby incorporated by reference.

BACKGROUND

The technology relates to: a machine learning device that learns a correlation between control information of an image forming apparatus and a printed matter outputted by the image forming apparatus; a machine learning method that learns the correlation between the control information of the image forming apparatus and the printed matter outputted by the image forming apparatus; a printing system that uses a learned model; a data processing system that uses the learned model obtained by the machine learning device and the machine learning method; and a data processing method that uses the learned model obtained by the machine learning device and the machine learning method.

An electrophotographic image forming apparatus such as a copying machine, a printer, and a multifunction peripheral is widely used particularly in an office environment. In recent years, the electrophotographic image forming apparatus has also been used in response to a need for printing specialized in a specific business of a specific industry in an industrial field such as a medical field, a manufacturing industry field, or a distribution industry field. Hereinafter, the above-described specialized printing may be also referred to as "industrial printing."

Non-limiting examples of the industrial printing may include package printing of a commodity, label printing of a label to be attached to an object such as a wine bottle, and printing of a wedding invitation. As can be understood from the examples described above, printing quality, i.e., image quality, greatly influences values of the commodity and the service in many cases. For this reason, the printing quality is particularly important for the printed material of the industrial printing.

Unlike printing using general paper such as A4-sized plain paper or B4-sized plain paper which is usually carried out in an office or any other scene, the industrial printing may use a special medium in accordance with a purpose and an application. Non-limiting examples of the special medium may include thick paper, long paper, Japanese paper, a paperboard, Western paper, a film, a label, and an envelope. The wide variety of media as those described above are hereinafter collectively referred to as a "print medium." When printing is performed on the print media by the same image forming apparatus, it may be necessary to adjust a control parameter of the image forming apparatus at the time of printing in accordance with the print medium Japanese Unexamined Patent Application Publication No. H09-329994A (JP-A No. H09-329994) discloses an example of an image forming apparatus that performs printing on a special print medium as those described above. An electrophotographic image forming apparatus disclosed in JP-A No. H09-329994 receives an input of a sheet selection key, and sets a transfer voltage and a fixing temperature according to the received input of the sheet selection key. The input of the sheet selection key is set by a user for each sheet according to a sheet thickness such as thin, medium, normal, or thick. Employing this method allows for adjustment f the control parameter according to the sheet thickness.

SUMMARY

It is desired that an image forming apparatus has high printing quality in an image recorded on a print medium and it is expected to further improve the printing quality.

It is desirable to provide a machine learning device, a data processing system, a printing system, a machine learning method, and a data processing method that each improve printing quality.

According to one embodiment of the technology, there is provided a machine learning device that includes a state variable acquiring section, a teaching data acquiring section, and a learned model generating section. The state variable acquiring section acquires feature information, medium information, and first control information as state variables. The feature information is information regarding a feature of an actual printed matter on which printing has been actually performed by an image forming apparatus. The medium information is information regarding a print medium used in the actual printed matter. The first control information is information regarding control performed when the actual printed matter has been outputted. The teaching data acquiring section acquires second control information as teaching data. The second control information is information regarding control that causes the feature information to fall within a predetermined threshold. The learned model generating section generates a learned model by performing machine learning on the basis of the feature information, the medium information, and the first control information acquired by the state variable acquiring section and the teaching data.

According to one embodiment of the technology, there is provided a data processing system that includes an actual printed matter information acquiring section, a data processor, and a control information storage section. The actual printed matter information acquiring section acquires feature information, medium information, and first control information. The feature information is information regarding a feature of an actual printed matter on which printing has been actually performed by an image forming apparatus. The medium information is information regarding a print medium used in the actual printed matter. The first control information is information regarding control performed by the image forming apparatus when the actual printed matter has been outputted. The data processor inputs the feature information, the medium information, and the first control information acquired by the actual printed matter information acquiring section into a learned model generated by the machine learning device described above, thereby generates third control information, and outputs the third control information. The control information storage section holds the third control information outputted by the data processor.

According to one embodiment of the technology, there is provided a printing system that includes a storage section, an actual printed matter information acquiring section, a data processor, and a printing instruction section. The storage section holds a learned model generated by performing machine learning on the basis of feature information, medium information, first control information, and teaching data. The feature information is information regarding a feature of an actual printed matter on which printing has been actually performed by an image forming apparatus.

The medium information is information regarding a print medium used in the actual printed matter. The first control information is information regarding control performed by the image forming apparatus when the actual printed matter has been outputted. The teaching data is second control information that is information regarding control causing the feature information to fall within a predetermined threshold. The actual printed matter information acquiring section acquires actual printed matter information including the medium information of a print medium to be used. The data processor inputs the actual printed matter information into the learned model, thereby generates third control information, and outputs the third control information. The printing instruction section gives, on the basis of user operation, a printing instruction to perform printing on the print medium to be used. The printing instruction section gives the printing instruction with use of the third control information outputted by the data processor.

According to one embodiment of the technology, there is provided a machine learning method including: performing, by a computer, a first process that acquires feature information, medium information, and first control information as state variables, the feature information being information regarding a feature of an actual printed matter on which printing has been actually performed by an image forming apparatus, the medium information being information regarding a print medium used in the actual printed matter, the first control information being information regarding control performed when the actual printed matter has been outputted; performing, by the computer, a second process that acquires second control information as teaching data, the second control information being information regarding control that causes the feature information to fall within a predetermined threshold; and performing, by the computer, a third process that generates a learned model by performing machine learning on the basis of the feature information, the medium information, the first control information, and the teaching data.

According to one embodiment of the technology, there is provided a data processing method including: performing, by a computer, first data processing that acquires feature information, medium information, and first control information, the feature information being information regarding a feature of an actual printed matter on which printing has been actually performed by an image forming apparatus, the medium information being information regarding a print medium used in the actual printed matter, the first control information being information regarding control performed by the image forming apparatus when the actual printed matter has been outputted; performing, by the computer, second data processing that inputs the acquired feature information, the acquired medium information, and the acquired first control information into a learned model, thereby generates third control information, and outputs the third control information, the learned model being generated by the machine learning method described above; and performing, by the computer, third data processing that stores the outputted third control information.

DETAILED DESCRIPTION

Figure 1:
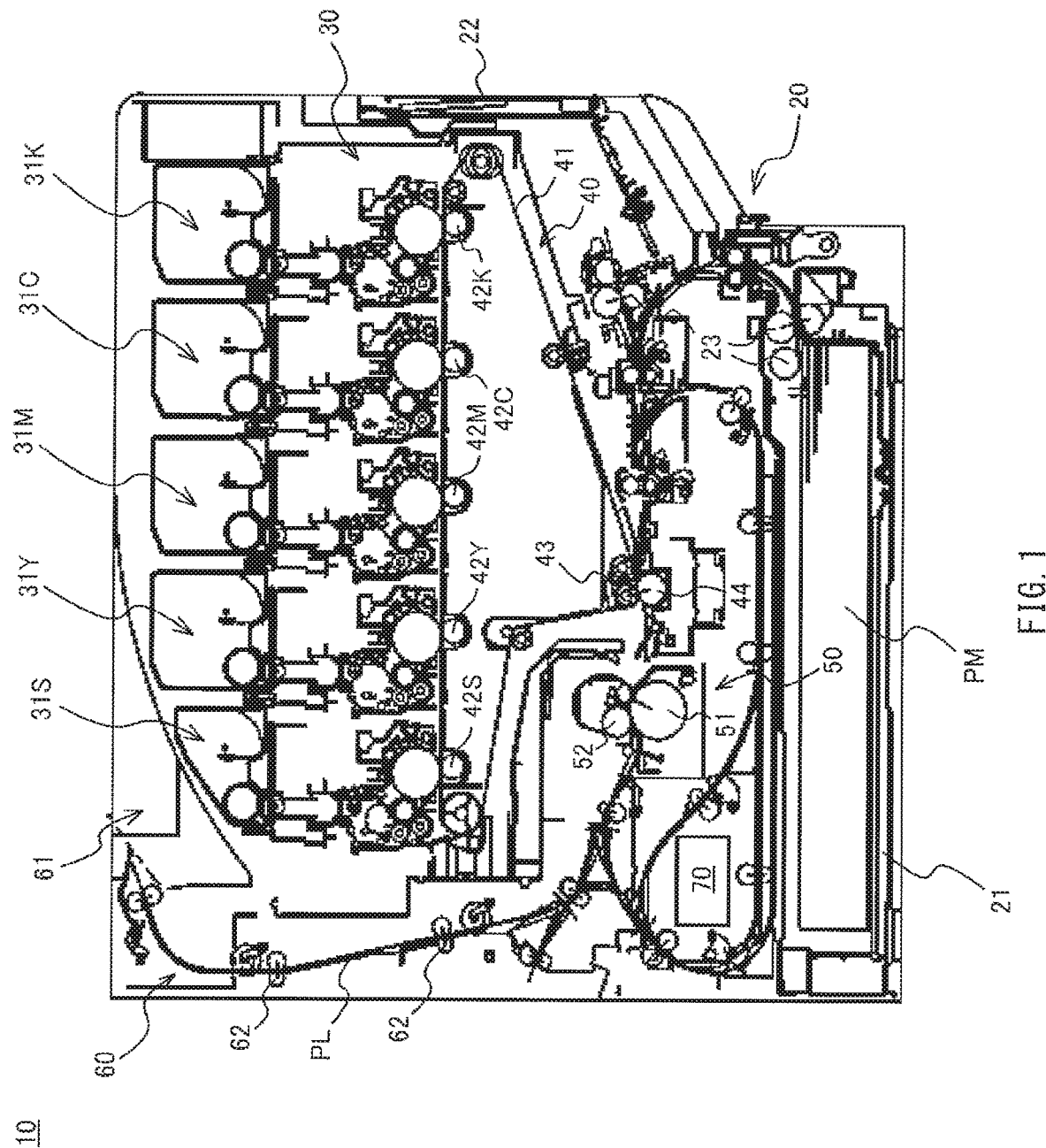
FIG. 1 is a schematic structure diagram illustrating an example of a configuration of an image forming apparatus according to one example embodiment of the technology.

Description is given below of some example embodiments of the technology with reference to the drawings. In the following description, a range necessary for the description for achieving the object of one embodiment of the technology is schematically described. A range necessary for the description of the relevant part of one embodiment of the technology is mainly described, and a portion of which the description is omitted may be achieved a publicly-known technique. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. Note that the like elements are denoted with the same reference numerals, and any redundant description thereof will not be described in detail.

First, brief description is given below of an example of a basic configuration of an electrophotographic image forming apparatus that performs printing output. The electrophotographic image forming apparatus may serve as a target to be learned by a machine learning device and a machine learning method according to an example embodiment of the technology.

[Image Forming Apparatus]

FIG. 1 is a schematic structure diagram of an example of an image forming apparatus to be used in the example embodiment of the technology. An image forming apparatus 10 described below as an example may be a so-called full-color light-emitting diode (LED) printer of an intermediate transfer type. As illustrated in FIG. 1, the image forming apparatus 10 may include a print medium feeding section 20, an image forming section 30, a transfer section 40, a fixing section 50, an output section 60, and a controller 70.

The print medium feeding section 20 may be directed to supplying a print medium PM into the image forming apparatus 10. The print medium feeding section 20 may include a print medium tray 21, a manual feed tray 22, and a plurality of print medium feeding rollers 23. The print medium tray 21 may contain a stack of a plurality of print media PM. One typical example of the print medium PM to be contained in the print medium tray 21 may include general paper such as A4-sized plain paper or B4-sized plain paper. The manual feed tray 22 may be so provided that the manual feed tray 22 is allowed to be contained in a side surface of a body of the image forming apparatus 10. The manual feed tray 22 may be directed to feed a special print medium PM mainly upon performing printing on the special print medium PM different from the general paper. The manual feed tray 22 may be therefore mainly used when industrial printing is performed. The print medium feeding rollers 23 may be so provided at appropriate positions that the print medium PM contained in the print medium tray 21 or placed on the manual feed tray 22 is conveyed to a conveyance path PL.

The image forming section 30 may be directed to forming a toner image. The image forming section 30 may include a plurality of image forming units 31 that are disposed side by side. For example, the image forming section 30 may include five image forming units 31, i.e., image forming units 31C, 31M, 31Y, 31K, and 31S that are disposed side by side. The image forming units 31C, 31M, 31Y, 31K, and 31S may basically have the same configuration except for colors of the respective toners. Each of the image forming units 31C, 31M, 31Y, 31K, and 31S may mainly include a photosensitive drum, a charging roller, a developing roller, an LED head, and a toner tank. An image formation process to be performed by each of the configurations described above may be similar to a known image forming process and therefore is not described in detail herein.

The image forming units 31C, 31M, 31Y, 31K, and 31S may be directed to forming toner images of cyan, magenta, yellow, black corresponding to a so-called key plate, and a special color, respectively. Employing of the plurality of image forming units 31 allows for full-color printing. The toner image formed by each of the image forming units 31 may be transferred onto an intermediate transfer belt 41 of the transfer section 40 which will be described later. Non-limiting examples of the toner of the special color described above may include a white toner, a clear toner, and a fluorescent toner such as a neon yellow toner.

The transfer section 40 may be directed to transferring, onto the print medium PM, the toner image formed by the image forming section 30. The transfer section 40 may include the intermediate transfer belt 41, a plurality of primary transfer rollers 42, a backup roller 43, and a secondary transfer roller 44. The primary transfer rollers 42 may include, for example, primary transfer rollers 42C, 42M, 42Y, 42K, and 42S. The intermediate transfer belt 41 may be an endless elastic belt supported by a plurality of rollers including a driving roller. The intermediate transfer belt 41 may mainly include a resin material such as rubber. The toner image of each color formed by the corresponding image forming unit 31 may be transferred onto a surface of the intermediate transfer belt 41 and thereby formed on the intermediate transfer belt 41. In other words, primary transfer may be performed on the surface of the intermediate transfer belt 41. The toner image formed on the surface of the intermediate transfer belt 41 may be transferred onto the print medium PM later. In other words, the toner image formed on the surface of the intermediate transfer belt 41 may be subjected to secondary transfer later. Each of the primary transfer rollers 42C, 42M, 42Y, 42K, and 42S may be directed to transferring, onto the intermediate transfer belt 41, the toner image of the corresponding color formed by the corresponding image forming unit 31. The primary transfer rollers 42C, 42M, 42Y, 42K, and 42S may be respectively opposed to the photosensitive drums of the image forming units 31C, 31M, 31Y, 31K, and 31S with the intermediate transfer belt 41 sandwiched therebetween. The primary transfer roller 42 may receive a predetermined primary transfer voltage. The primary transfer voltage may be controlled by the controller 70 which will be described later.

The backup roller 43 may be one of the rollers that support the intermediate transfer belt 41. The backup roller 43 may be disposed at a position opposed to the secondary transfer roller 44 described below with the intermediate transfer belt 41 interposed therebetween. The secondary transfer roller 44 may be disposed at a position that is in the middle of the conveyance path PL and is opposed to the backup roller 43 with the intermediate transfer belt 41 interposed therebetween. The secondary transfer roller 44 may be directed to transferring, the toner image formed on the intermediate transfer belt 41 in advance when the print medium PM passes between the secondary transfer roller 44 and the intermediate transfer belt 41. The secondary transfer roller 44 may receive a predetermined secondary transfer voltage. The secondary transfer voltage may be controlled by the controller 70 which will be described later.

The fixing section 50 may be directed to fixing the toner image to the print medium PM by applying heat and pressure to the print medium PM onto which the toner image has been transferred by the transfer section 40. The fixing section 50 may include a fixing roller 51 and a pressure-applying roller 52. The fixing roller 51 may include an unillustrated built-in heater. A toner fixing temperature may be controlled by a current value of a current supplied to the heater. The current value of the current supplied to the heater may be controlled by the controller 70 which will be described later. The pressure-applying roller 52 may be applied with biasing force against the fixing roller 51. Accordingly, the print medium PM passing between the fixing roller 51 and the pressure-applying roller 52 may be applied with predetermined fixing pressure. Although the example embodiment may employ a configuration in which the pressure-applying roller 52 is biased against the fixing roller 51, this is non-limiting. In one example embodiment, a fixed backup roller may be provided instead of the pressure-applying roller 52 and a configuration may be employed in which the fixing roller 51 is biased against the backup roller.

The output section 60 may output, to outside of the image forming apparatus 10, the print medium PM to which the toner image has been fixed by the fixing section 50, as an actual printed matter AP. The output section 60 may include a discharge tray 61 and a plurality of conveying rollers 62. The discharge tray 61 may be provided at an upper portion of the image forming apparatus 10. The discharge tray 61 may receive thereon the actual printed matter AP outputted via the conveyance path PL. The conveying rollers 62 may be provided at respective positions on the conveyance path PL. The conveying rollers 62 may convey the print medium PM to the discharge tray 61. In one example embodiment, a cooler directed to removing heat generated upon fixing of the toner image may be optionally disposed at any position in the output section 60. Non-limiting examples of the cooler may include a roller that dissipates heat and provided as at least a portion of the conveying rollers 62. Non-limiting examples of the cooler may also include a known heat pipe, a known heat sink, a known fan, or any other suitable component disposed at a predetermined position in the output section 60. Any other suitable configuration may be also employed as the cooler.

The controller 70 may be directed to controlling each section of the image forming apparatus 10. The controller 70 may include a component such as a known central processing unit (CPU) or a known storage device. The controller 70 may control the secondary transfer voltage applied to the secondary transfer roller 44 and the current value of the current supplied to the heater built in the fixing roller 51, as described above.

Although, as described above, the full-color LED printer of the intermediate transfer type has been described as the image forming apparatus 10 used in an example embodiment of the technology, the image forming apparatus to which one embodiment of the technology is applicable is not limited thereto. In one specific but non-limiting example embodiment, a tandem method or a rotary method that performs direct transfer from the photosensitive drum onto the print medium may be employed instead of the intermediate transfer method. In one specific but non-limiting example embodiment, monochrome image forming apparatus may be employed instead of the full-color image forming apparatus. In one specific but non-limiting example embodiment, a full-color image forming apparatus that includes no toner of a special color may be employed instead of the full-color image forming apparatus that includes the toner of the special color. In one specific but non-limiting example embodiment, a laser head may be employed instead of the LED head as an exposure device. In one specific but non-limiting example embodiment, a copying machine may be employed instead of the printer. In one specific but non-limiting example embodiment, a facsimile may be employed instead of the printer. In one specific but non-limiting example embodiment, a digital multifunction peripheral combining a printer, a copying machine, a facsimile, etc. may be employed instead of the printer.

In a case of performing the industrial printing with use of the image forming apparatus 10 having the above-described configuration, it has been difficult to sufficiently adjust the control parameter by existing techniques, as described above. As a result, the industrial printing may have a high rate of low-quality printing or of print defect. In a case where such a print defect occurs, a specialized engineer may perform a series of works to obtain a desired printing result. The series of works may include comprehensively considering information such as a condition of the actual printed matter on which printing is actually performed or control information of the image forming apparatus at the time when printing is performed, and deriving an optimal control parameter on the basis of previous experiences and accumulated knowledge. This series of works, however, takes a long time and occupies an engineer every time the print defect occurs, which results in an extremely-high cost. Accordingly, one embodiment of the technology is directed to automating adjustment of the control information, e.g., the control parameter, of the image forming apparatus 10 by using a learned model generated by a machine learning device 100 and a machine learning method described below.

When printing is executed using the image forming apparatus as described above, various control parameters may be adjusted in order to obtain an optimum printing result. The various control parameters have been examined by the inventors and it is found that, among the various control parameters, the secondary transfer voltage applied to the secondary transfer roller 44 and the toner fixing temperature of the fixing roller 51, i.e., the current value of the current supplied to the heater in the fixing roller 51, may be pieces of control information that have a direct effect on the printing quality. In other words, it is found that the secondary transfer voltage and the toner fixing temperature may be the pieces of control information having a higher correlation with the print defect occurring on the printing surface. According to detailed examination of a relationship between the two pieces of control information and the print defect, the following has been found. That is, a high secondary transfer voltage may mainly cause a print defect of a void, and a low secondary transfer voltage may mainly cause a print defect of a faint color. A high toner fixing temperature may mainly cause a print defect of a spot-like pattern, and a low toner fixing temperature may mainly cause a print defect of insufficient fixing, i.e., a print defect of falling off of the toner, or a print defect of registration displacement, i.e., a print defect of a low density portion.

Accordingly, the secondary transfer voltage and the toner fixing temperature may be set as the control information to be adjusted for the machine learning device 100 according to an example embodiment of the technology described below. Description is given below of a specific but non-limiting configuration and a series of machine learning method directed to creating a learned model by which the two pieces of control information are adjusted.

[Machine Learning Device]

Figure 2:
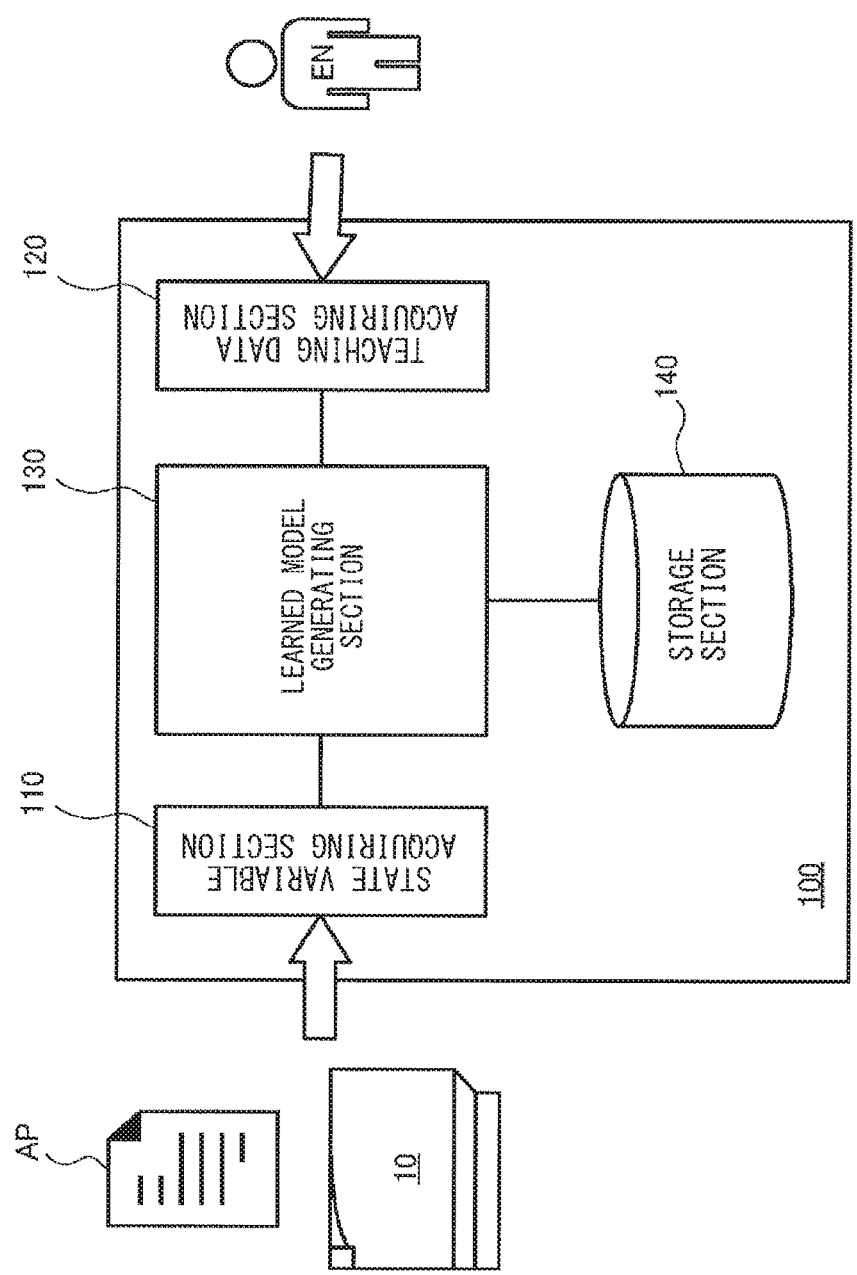
FIG. 2 is a schematic block diagram illustrating an example of a configuration of a machine learning device according to one example embodiment of the technology.

FIG. 2 is a schematic block diagram of the machine learning device 100 according to the example embodiment of the technology. The machine learning device 100 includes a state variable acquiring section 110, a teaching data acquiring section 120, and a learned model generating section 130. The machine learning device 100 may also include a storage section 140. As can be appreciated from the above-described components, the machine learning device 100 according to the example embodiment may generate a learned model by so-called supervised learning. For the purpose of easy understanding, FIG. 2 illustrates an example in which the machine learning device 100 is built in a computer provided separately from the image forming apparatus 10. Non-limiting examples of the separately-provided computer may include a server device and a personal computer (PC). In one example embodiment, however, the machine learning device 100 may be built in the image forming apparatus 10.

The state variable acquiring section 110 may acquire, as a state variable, parameter information required to generate the learned models by which the control information of the image forming apparatus 10 is adjustable. In performing machine learning, the state variable may be a more important factor that determines accuracy of the generated learned model. Different combinations of pieces of information acquired as the state variables result in different learned models to be generated. It is to be therefore noted that the combination of pieces of information acquired as the state variables may also be an important factor.

In the example embodiment, the state variable acquiring section 110 acquires, as the state variables, three pieces of information, that are, feature information, medium information, and control information. The feature information is information regarding a feature of the actual printed matter AP. The medium information is information regarding the print medium PM, for example, that illustrated in FIG. 1, used in the actual printed matter AP. The control information is information regarding control performed when the actual printed matter AP has been outputted. The above-described control information is hereinafter referred to as "first control information." A method of acquiring the state variables may be set to any method in accordance with a coupling state of the machine learning device 100 and the image forming apparatus 10. Non-limiting examples of the method of acquiring the state variable may include acquisition with use of a local communication method, acquisition with use of the Internet-based communication method, and acquisition via any storage medium. The acquired three pieces of information may be stored in the storage section 140, which will be described later, as a single data set.

The feature information of the actual printed matter AP may include information regarding a print defect present on the actual printed matter AP. The information regarding the print defect may be information regarding a degree of the print defect. Information of image data obtained by reading the actual printed matter AP with use of a known scanner may be sufficient as the feature information to be actually inputted into the machine learning device 100. It may be unnecessary to specify in advance a specific type or degree of the print defect present on the actual printed matter AP. One reason for this is that, since the learning method of the machine learning device is to learn the control information as a suitable output result with respect to the state variable independently of a type or a degree of the print defect, it may be unnecessary to make a distinction between types or degrees of the print defects. In one example embodiment, however, a pre-processing process may be employed. The pre-processing process may, for example, adjust in advance the information of the image data described above to be information suitable for inputting into an input layer of the machine learning device. For example, the pre-processing process may adjust in advance the information of the image data described above to be information regarding the type or the degree of the print defect. Since a person skilled in the art can easily understand that a method typically used in the technical field of image recognition can be employed as the pre-processing process, a specific pre-processing process is not described further.

The medium information of the print medium PM may be various pieces of information regarding the print medium PM. In one example embodiment, the medium information of the print medium PM may be information regarding presence or absence of coating, a material, a thickness, a weight, and a density of the print medium PM. The above-described five types of medium information, i.e., the presence or absence of coating, the material, the thickness, the weight, and the density, are specified by the inventors as parameters that have a greater influence on printing quality. Performing the machine learning on the basis of the above-described five types of medium information allow for efficient generation of a highly-accurate learned model. It may be sufficient to specify a main material used in the print medium PM as the material for the medium information. It is not always necessary to provide information regarding a material additionally included in the print medium PM. The weight for the medium information may be any of various types of weights that represents a characteristic related to the weight for the print medium PM. Non-limiting examples of the weight for the medium information may include a weight typically used in the technical field of image forming apparatuses, such as a basis weight or a ream weight.

The first control information may be a control parameter actually set when the actual printed matter AP is outputted. In one example embodiment, the first control information may be the toner fixing temperature of the fixing roller 51 in the image forming apparatus 10 and the secondary transfer voltage applied to the secondary transfer roller 44. The secondary transfer voltage may be used as the first control information in the image forming apparatus 10 described above since the image forming apparatus 10 may transfer the toner image from the intermediate transfer belt 41 onto the print medium PM. In a tandem-type image forming apparatus that includes no intermediate transfer belt and transfers the toner image directly from the photosensitive drum onto the print medium, the first control information may be a transfer voltage applied when the toner image is transferred onto the print medium PM from the photosensitive drum of each of the image forming units corresponding to different colors of toners.

The teaching data acquiring section 120 acquires, as teaching data, information regarding control that causes the feature information to fall within a predetermined threshold. The feature information may be the information regarding the print defect of the actual printed matter AP having the print defect. Hereinafter, the information regarding the above-described control may be referred to as "second control information." Briefly, the second control information may be control information that is so improved that a printing result without the print defect is obtained. The second control information may be, for example, derived by an engineer EN on the basis of an output result of the actual printed matter AP, the control information at the time of the output of the actual printed matter AP, or any other suitable information, for example. The "predetermined threshold" described above does not necessarily refer to a specified value accordingly. As long as the control information allows for an output result that is appropriate from the engineer EN point of view, it can be said that the control information causes "the feature information to fall within the predetermined threshold." The second control information may be acquired by direct input by the engineer EN into the teaching data acquiring section 120 or by transmission by the engineer EN via any of various communication methods or any storage medium. The second control information may be stored in the storage section 140 in association with a corresponding data set acquired by the state variable acquiring section 110 and stored in the storage section 140.

The learned model generating section 130 performs machine learning and generates the learned model. The learned model generating section 130 may execute the machine learning on the basis of the data set including the three pieces of information acquired by the state variable acquiring section 110 as the state variables and the teaching data acquired by the teaching data acquiring section 120 and associated with the corresponding data set. Detailed description is given below of a specific but non-limiting method of the machine learning performed in the example embodiment.

The machine learning device 100 according to one example embodiment of the technology may employ, as a learning technique, supervised learning with use of a neural network model.

Figure 3:
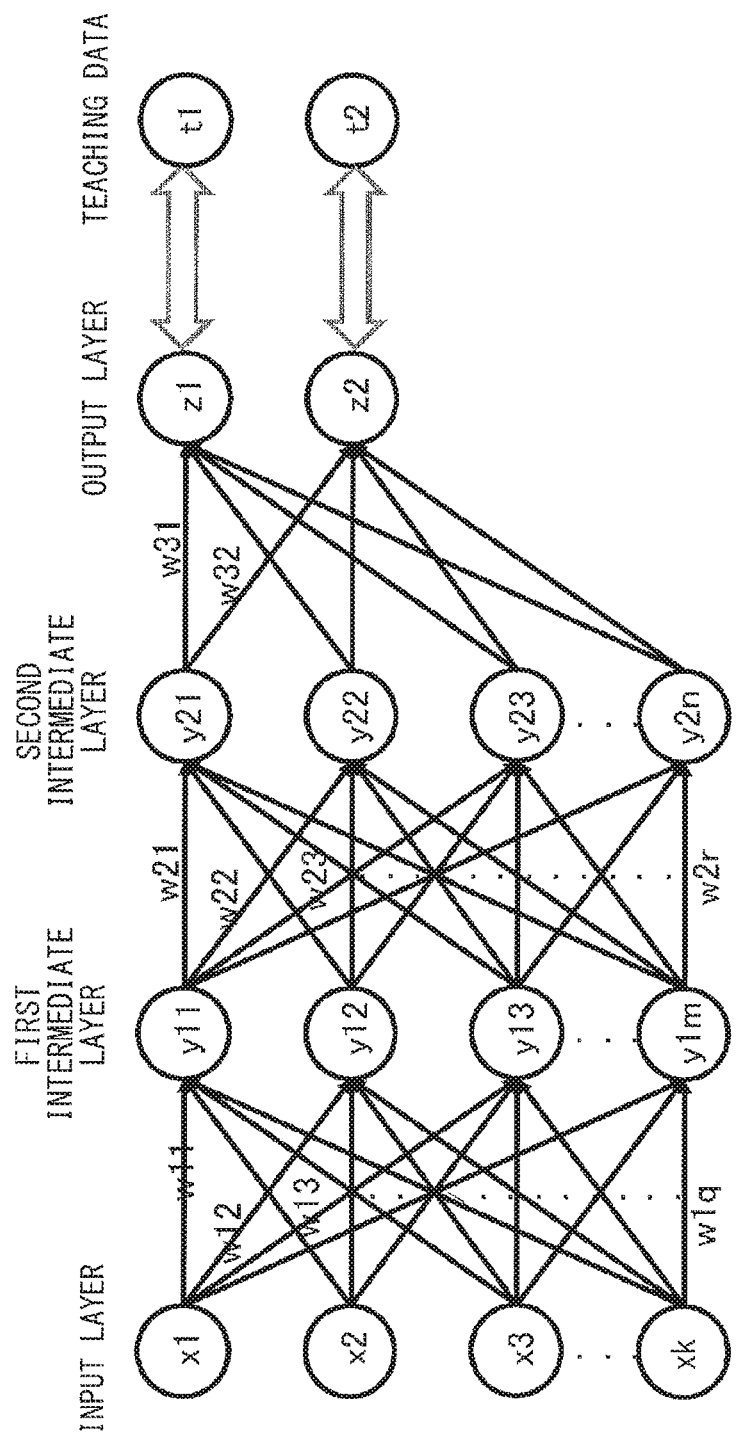
FIG. 3 is an explanatory diagram illustrating an example of a neural network model for supervised learning performed by a machine learning device illustrated in FIG. 2.

FIG. 3 illustrates an example of the neural network model for the supervised learning to be performed by a machine learning device according to an example embodiment of the technology. A neural network in the neural network model illustrated in FIG. 3 may include k-number of neurons, i.e., neurons x1 to xk, in an input layer, m-number of neurons, i.e., neurons y11 to y1$m$, in a first intermediate layer, n-number of neurons, i.e., neurons y21 to y2$n$, in a second intermediate layer, and two neurons, i.e., neurons z1 and z2, in an output layer. The first intermediate layer and the second intermediate layer are each also referred to as a hidden layer. In one example embodiment, the neural network may include a plurality of hidden layers in addition to the first intermediate layer and the second intermediate layer. In another example embodiment, the neural network may include only the first intermediate layer as the hidden layer.

Nodes coupling neurons between layers may be provided between the input layer and the first intermediate layer, between the first intermediate layer and the second intermediate layer, and between the second intermediate layer and the output layer. Each of the nodes may have a corresponding weight wi where "i" is a natural number.

In the neural network in the neural network model according to the example embodiment, the learned model generating section 130 may use a learning data set and thereby learn a correlation between the control information of the image forming apparatus and the printed matter outputted by the image forming apparatus. In a specific but non-limiting example, the learned model generating section 130 may associate each neuron in the input layer with any of the three state variables. Further, the learned model generating section 130 may calculate a value of each neuron in the output layer by using a typical method of calculating an output value of a neural network. In a specific but non-limiting example, the learned model generating section 130 may perform calculation for the input layer and the first intermediate layer. For example, the learned model generating section 130 may calculate a value of each neuron on the output side as a sum of numerical sequences of multiplication values of values of the plurality of neurons on the input side coupled to the neurons on the output side and the plurality of weights wi associated with the nodes coupling the neurons on the output side and the plurality of neurons on the input side. In this case, the output side corresponds to the first intermediate layer and the input side corresponds to the input layer. The learned model generating section 130 may perform similar calculation for the first intermediate layer and the second intermediate layer, and for the second intermediate layer and the output layer. The learned model generating section 130 may perform the above-described computation for all the neurons other than the neurons in the input layer. The learned model generating section 130 may thereby calculate the values of the respective neurons in the output layer. In associating the state variables with the neurons in the input layer, a form of associating the information acquired as the state variable may be appropriately set taking into consideration a factor such as accuracy of the learned model to be generated. For example, in associating, with the input layer, the image data of the actual printed matter AP as the feature information of the actual printed matter AP, the image data may be divided into predetermined regions, and a color value information of each divided region may be associated with the input layer. Non-limiting examples of the color value information may include an RGB value.

The learned model generating section 130 may compare the calculated values of the two neurons z1 and z2 in the output layer with the values of the two teaching data t1 and t2, respectively, and thereby obtain an error between the value of the neuron z1 and the value of the teaching data t1 and an error between the value of the neuron z2 and the value of the teaching data t2. The values of the neurons z1 and z2 may be the toner fixing temperature of the fixing roller 51 and the secondary transfer voltage to be applied to the secondary transfer roller 44 in the example embodiment. The values of the teaching data t1 and t2 may be the toner fixing temperature of the fixing roller 51 and the secondary transfer voltage to be applied to the secondary transfer roller 44 both associated with the data set. The learned model generating section 130 may so adjust the weights wi associated with the respective nodes repeatedly that the determined error is reduced. In other words, the learned model generating section 130 may perform backpropagation.

The learned model generating section 130 may finish the learning and store the neural network model as the learned model in the storage section 140 when a predetermined condition is satisfied. Non-limiting examples of the predetermined condition may include that the above-described series of processes are repeatedly performed a predetermined number of times, and that the above-described error becomes smaller than an acceptable value. The learned model generating section 130 may thus generate the learned model that includes information regarding all of the weights wi associated with the respective nodes of the neural network model.

The learned model stored in the storage section 140 may be applied to a real system via a communication method such as the Internet or via a storage medium upon request. A specific but non-limiting application of the learned model to the real system, e.g., a data processing system, will be described later in detail.

The state variable acquiring section 110 may correspond to a "state variable acquiring section" in one specific but non-limiting embodiment of the technology. The teaching data acquiring section 120 may correspond to a "teaching data acquiring section" in one specific but non-limiting embodiment of the technology. The learned model generating section 130 may correspond to a "learned model generating section" in one specific but non-limiting embodiment of the technology.

[Machine Learning Method]

Figure 4:
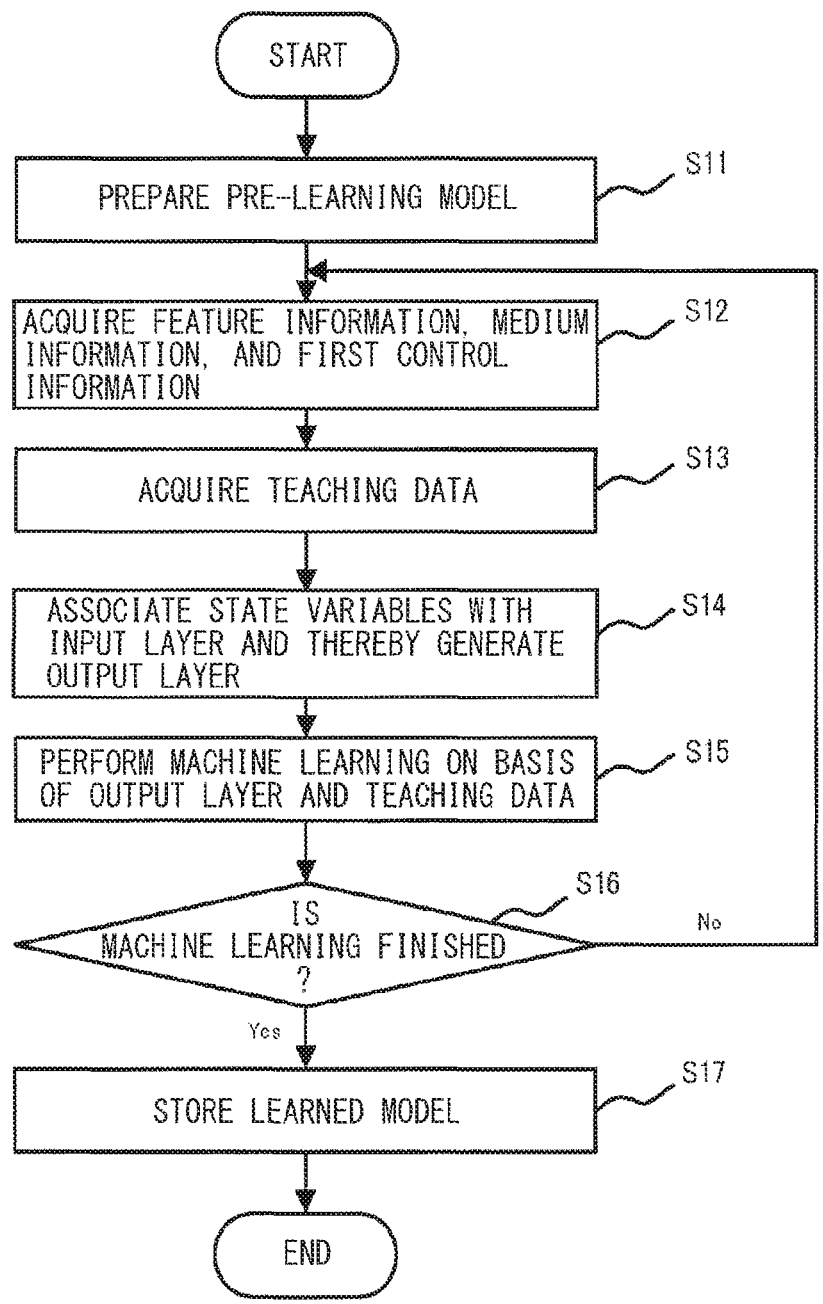
FIG. 4 is a flowchart illustrating an example of a machine learning method of the machine learning device illustrated in FIG. 2.

According to one embodiment of the technology, a machine learning method is also provided in relation to the above-described machine learning device. FIG. 4 is a flowchart illustrating a machine learning method according to an example embodiment of the technology. The machine learning method may be implemented with use of a computer. The computer may be of various types. Non-limiting examples of the computer may include a computer included in the controller 70 in the image forming apparatus 10, a PC locally coupled to the image forming apparatus 10, and a server device provided on a network.

In a case of executing the supervised learning as the machine learning method according to one example embodiment of the technology, the machine learning device 100 may first prepare a pre-learning model having an initial-value weight (step S11.) Thereafter, the state variable acquiring section 110 acquires the feature information, the medium information, and the first control information as the state variables (step S12.) The feature information is information regarding the feature of the actual printed matter AP on which printing has been actually performed by the image forming apparatus 10. The medium information is information regarding the print medium PM used in the actual printed matter AP. Thereafter, the teaching data acquiring section 120 may acquire the teaching data corresponding to the state variables acquired in step S12 (step S13.) Before or after step S13, the learned model generating section 130 may generate the output layer illustrated in FIG. 8 by associating the state variables acquired in step S12 with the input layer illustrated in FIG. 8 of the pre-learning model (step S14.)

Since the control information included in the output layer generated in step S14 may be generated on the basis of the pre-learning model, the control information may not contribute to obtain a printing result satisfying the user's requirement in usual cases. The learned model generating section 130 may therefore perform the machine learning with use of the control information included in the teaching data acquired in step S13 and the control information included in the output layer generated in step S14 (step S15.) The machine learning in this example may be executed by: comparing the control information included in the teaching data with the control information included in the output layer; detecting an error between the above-described two pieces of control information; and so adjusting the weights Wi associated with the respective nodes in the pre-learning model as to obtain the output layer making the error smaller.

When the machine learning is executed in step S15, the learned model generating section 130 may determine whether the machine learning is to be finished, i.e., whether or not the machine learning needs to be executed further (step S16.) In a case where the machine learning is to be continuously executed (No in step S16), the flow may return to step S12. In a case where the machine learning is to be finished (Yes in step S16), the flow may proceed to step S17. In the case where the above-described machine learning is to be continuously executed, the learned model generating section 130 may perform the processes in steps S12 to S15 a plurality of times. Usually, the accuracy of the learned model generated finally increases in proportion to the number of times the learned model generating section 130 performs the processes.

In the case where the machine learning is to be finished, the learned model generating section 130 may store, as the learned model, the neural network generated by adjusting the weights Wi associated with the respective nodes through a series of processes (step S17) in the storage section 140. The learned model generating section 130 may thereby bring the series of learning processes to an end. The stored learned model may be applied to and used by various types of data processing systems which will be described later in detail.

In the learning process of the machine learning device and the machine learning method described above, for example, the machine learning process may be repeatedly performed a plurality of times for a single neural network or pre-learning model to improve accuracy of the neural network or pre-learning model, thereby generating a single learned model to be applied to the data processing system. One embodiment of the technology is, however, not limited to the above-described acquiring method. In one example embodiment, a plurality of learned models each having been subjected to a predetermined number of times of machine learning may be stored in the storage section 140 as candidates. The data set directed to judging validity may be inputted into the group of learned models and output layers or values of neurons in the output layers may be generated thereby. Accuracy of the control information determined by the output layers may be compared and examined. The single most appropriate learned model may be thereby selected that is to be applied to the data processing system. It may be sufficient that the data set directed to judging validity includes the same types of state variables as those in the data set directed to and used in the learning and include pieces of data from those in the data set directed to and used in the learning.

As an experimental example, the series of learning processes described in steps S12 to S16 was repeatedly performed 15,000 times while changing the state variables to be acquired, and a learned model was thereby prepared. Control information of the output layer obtained by inputting 1,500 types of state variables into the input layer of the learned model was compared with control information determined by an engineer on the basis of each of the 1,500 types of state variables. Validity was judged on the basis of a degree of an error resulting from the comparison. As a result, the control information of the output layer outputted by the learned model and the control information determined by the engineer substantially coincided with each other in about 90% of the cases. This supports that the three state variables selected in the example embodiment are more important information that influences the printing result.

According to the machine learning device and the machine learning method of the example embodiment of the technology, it is possible to generate a learned model that improves, with high accuracy, the print defect occurring upon printing on various types of print media, such as in the industrial printing, as described above. Accordingly, applying the above-described learned model to a real system makes it possible to improve, with higher accuracy, the print defect and thereby obtain a desired printing result. Further, automatic adjustment of the printing information is achieved with use of the above-described learned model. This makes it unnecessary for a human to work every time the print defect occurs, leading to a lower-cost data processing system. Further, the above-described reduction in cost allows the user to casually try using a plurality of special print media without being bothered with cost upon performing the industrial printing. This improves a degree of freedom in the user's selection of the print medium. Further, specifying the three pieces of information described above as the state variables to be inputted into the input layer of the machine learning device and the machine learning method makes it possible to highly-effectively generate a learned model with higher accuracy applicable to printing output of various types of special print media.

As described above, the machine learning device 100 includes the state variable acquiring section 110, the teaching data acquiring section 120, and the learned model generating section 130, for example, as illustrated in FIG. 2. The state variable acquiring section 110 acquires the feature information, the medium information, and the first control information as the state variables. The feature information is information regarding the feature of the actual printed matter AP on which printing has been actually performed by the image forming apparatus 10. The medium information is information regarding the print medium PM used in the actual printed matter AP. The first control information is information regarding control performed when the actual printed matter AP has been outputted. The teaching data acquiring section 120 acquires the second control information as the teaching data. The second control information is information regarding control that causes the feature information to fall within the predetermined threshold. The learned model generating section 130 generates the learned model by performing the machine learning on the basis of the feature information, the medium information, and the first control information acquired by the state variable acquiring section 110 and the teaching data. The machine learning is thereby performed by employing the three pieces of information, i.e., the feature information, the medium information, and the first control information, as the state variables. It is therefore possible to obtain a desired learned model having higher accuracy.

The feature information of the machine learning device 100 may include the information regarding the print defect on the actual printed matter AP. This allows for generation, in the machine learning, of the learned model that solves the print defect present on the actual printed matter AP. It is therefore possible to generate the learned model that allows for user-desired data processing.

The medium information of the machine learning device 100 may include the information regarding the presence or absence of coating, the material, the thickness, the weight, and the density of the print medium PM. This allows for consideration, at the time of the machine learning, of various types of medium information regarding the print medium PM in addition to the thickness of the print medium PM. It is therefore possible to generate the learned model sufficiently taking into consideration the medium information.

The first control information of the machine learning device 100 may include the information regarding the toner fixing temperature and the transfer voltage of the electrophotographic image forming apparatus 10 illustrated in FIG. 1, for example. The transfer voltage may be the secondary transfer voltage in the above-described example embodiment. This allows the first control information to include two pieces of information that have a greater influence on the printing quality. It is therefore possible to generate the learned model that is capable of performing user-desired data processing.

The second control information of the machine learning device 100 may include the information regarding the toner fixing temperature and the transfer voltage of the electrophotographic image forming apparatus 10 illustrated in FIG. 1, for example. The transfer voltage may be the secondary transfer voltage in the above-described example embodiment. This allows the second control information to include the toner fixing temperature and the transfer voltage that are typically used as control parameters in the electrophotographic image forming apparatus. The learned model is therefore applicable to various types of electrophotographic image forming apparatuses.

Figure 9:
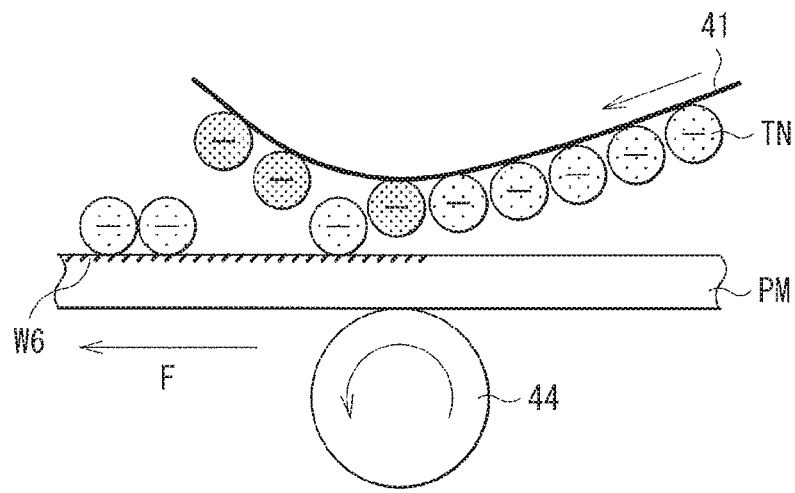
FIG. 9 is an explanatory diagram illustrating still another example of the state of the toner on the print medium in the vicinity of the secondary transfer roller of the transfer section.

The above-described machine learning method includes step S12, step S13, and step S15, as illustrated in FIG. 9, for example. Step S12 acquires, by a computer, the feature information, the medium information, and the first control information as the state variables. The feature information is information regarding the feature of the actual printed matter AP on which printing has been actually performed by the image forming apparatus 10. The medium information is information regarding the print medium PM used in the actual printed matter AP. The first control information is information regarding control performed when the actual printed matter AP has been outputted. Step S13 acquires the second control information as the teaching data. The second control information is information regarding control that causes the feature information to fall within the predetermined threshold. Step S15 generates the learned model by performing the machine learning on the basis of the feature information, the medium information, the first control information, and the teaching data. The machine learning is thereby performed by employing the three pieces of information, i.e., the feature information, the medium information, and the first control information, as the state variables. It is therefore possible to obtain a desired learned model having higher accuracy.

[Another Example Embodiment]

The example embodiment has been described above referring to the machine learning device and the machine learning method that each acquire, as the state variables, three pieces of information: the feature information that is the information regarding the feature of the actual printed matter AP; the medium information that is the information regarding the print medium PM used in the actual printed matter AP; and the first control information that is the information regarding the control performed when the actual printed matter AP has been outputted. As a result of further examination by the inventors, it is found that a highly-accurate learned model is generated also by acquiring, as the state variable, environment information in addition to the three state variables described above. The environment information may be information regarding environment around the image forming apparatus 10. Description is given below of a machine learning method in a case where the above-described four pieces of information are selected as the state variables, as another example embodiment of the technology. The machine learning device according to the other example embodiment described below may have a configuration similar to that in the above description of the example embodiment described above except that the state variable acquiring section 110 acquires different information. Detailed description of the machine learning device according to the other example embodiment is therefore omitted.

Figure 5:
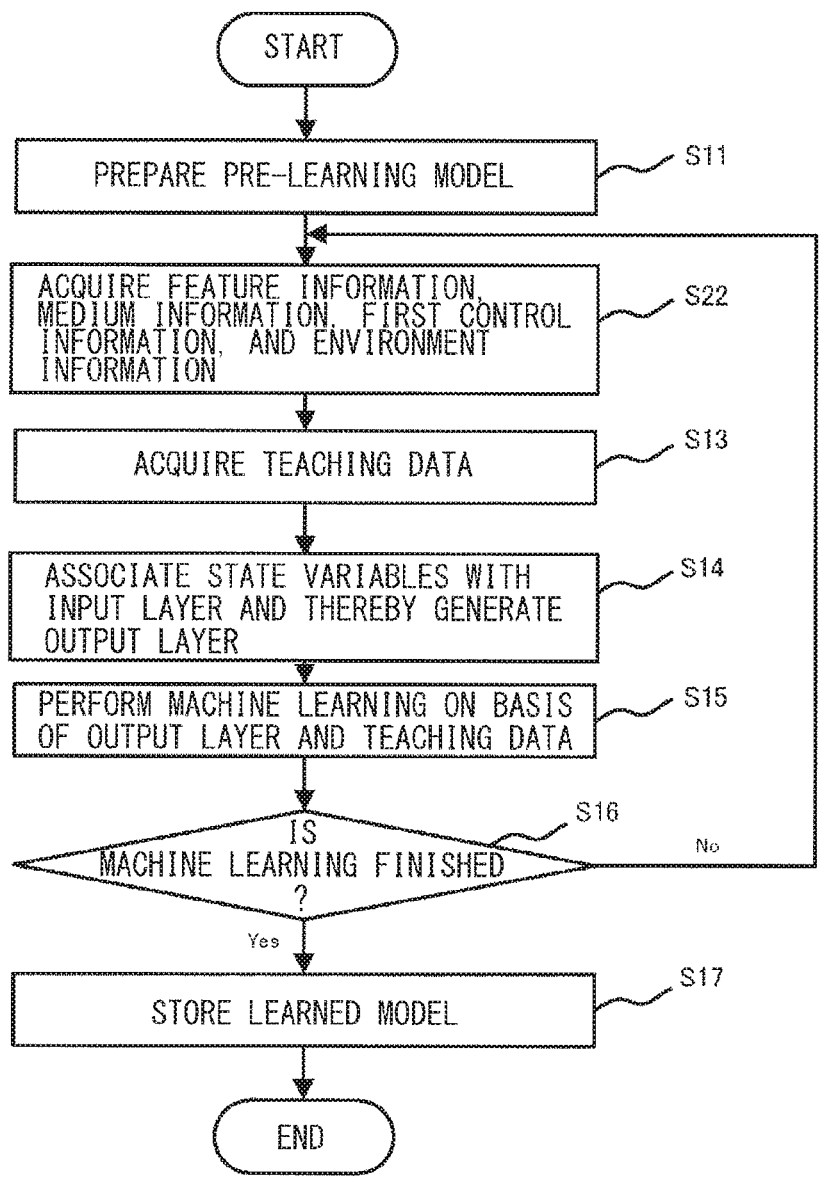
FIG. 5 is a flowchart illustrating an example of a machine learning method according to one example embodiment.

FIG. 5 is a flowchart illustrating the machine learning method according to the other example embodiment of the technology. A series of processes in the other example embodiment may be almost the same as those of the machine learning method according to the example embodiment described above except for step S22, as can be appreciated from FIG. 5. Substantially the same process is denoted with the same numeral character and the description in the example embodiment above shall be referred to. Description given below mainly focuses on a part different from the above-described example embodiment.

In the machine learning method according to the other example embodiment, the state variable acquiring section 110 acquires the feature information, the medium information, the first control information, and the environment information as the state variables, after the learned model generating section 130 prepares the pre-learning mode (step S22.) The feature information is the information regarding the feature of the actual printed matter AP on which printing has been actually performed by the image forming apparatus 10. The medium information is the information regarding the print medium PM used in the actual printed matter AP. The environment information may be information regarding environment around the image forming apparatus 10.

The environment information may include a temperature and humidity around a position at which the image forming apparatus 10 is installed. In one specific but non-limiting example, the temperature and the humidity may be measured by providing, inside the image forming apparatus 10, a sensor directed to measuring the temperature and the humidity. In another specific but non-limiting example, the temperature and the humidity may be measured by acquiring outputs from a temperature and humidity sensor provided separately from the image forming apparatus 10. In still another specific but non-limiting example, the temperature and the humidity around the image forming apparatus 10 may be acquired by input operation performed directly by the user or input operation performed by the user via any communication device instead of the above described measuring operation.

When the state variables are acquired in step S22, the teaching data acquiring section 120 may acquire teaching data corresponding to the acquired state variables, i.e., teaching data including four pieces of information (step S13.) Before or after step S13, the learned model generating section 130 may generate the output layer with use of the state variables acquired in step S22 (step S14.) Thereafter, the learned model generating section 130 may execute the machine learning on the basis of the teaching data acquired in step S13 and the output layer acquired in step S14 described above (step S15.) The learned model generating section 130 may generate the teamed model by executing the above-described series of learning processes a plurality of times.

According to the machine learning method of the other example embodiment described above, another state variable may be acquired additionally compared to the example embodiment described above. This allows for machine learning taking into consideration the environment in which the image forming apparatus 10 is installed, for example, whether the image forming apparatus 10 is installed in a cold region, whether the image forming apparatus 10 is installed in a dry room, etc. Accordingly, it is expected that the learned model generated according to the other example embodiment achieves adjustment of the control information with further higher accuracy.

The machine learning device 100 may be so applied as to be built in an apparatus such as the image forming apparatus 10 or a usual PC, as described above. Upon executing the machine learning, however, an extremely-great amount of computation may be performed especially in a case where a number of parameters are inputted. It may possibly take a lot of time to generate the learned model only by the CPU mounted on the usual image forming apparatus 10. Accordingly, in one example embodiment in a case where the machine learning device 100 is built in an apparatus such as the image forming apparatus 10 or the usual PC, any kind of measure may be taken in order to reduce computation process time. For example, a high-performance computation device such as a graphics processing unit (GPC) may be additionally provided. For example, computation ability of another apparatus such as another PC or a server device coupled to the apparatus such as the image forming apparatus 10 or the usual PC via a network may be used to perform the computation at the time of the machine learning.

The selection of the state variables regarding the machine learning device according to one embodiment of the technology is an important factor that directly influences the learned model to be generated, as described above. This is, however, not intended to completely exclude a combination other than the combination of the three or four state variables employed in the example embodiments described above. For example, an input parameter that has an influence, on the learned model to be generated, sufficiently smaller than the three or four parameters employed in the example embodiments described above may be additionally provided to the machine learning apparatus, etc. This is encompassed in the technical scope of the technology as this does not substantially depart from the technical idea of the technology.

As described above, the machine learning device 100 includes the state variable acquiring section 110, the teaching data acquiring section 120, and the learned model generating section 130, for example, as illustrated in FIGS. 2 and 5. The state variable acquiring section 110 may acquire the feature information, the medium information, the first control information, and the environment information as the state variables. The feature information is information regarding the feature of the actual printed matter AP on which printing has been actually performed by the image forming apparatus 10. The medium information is information regarding the print medium PM used in the actual printed matter AP. The first control information is information regarding control performed when the actual printed matter AP has been outputted. The environment information may be information regarding an environment around the image forming apparatus 10. The teaching data acquiring section 120 acquires the second control information as the teaching data. The second control information is information regarding control that causes the feature information to fall within the predetermined threshold. The learned model generating section 130 may generate the learned model by performing the machine learning on the basis of the feature information, the medium information, the first control information, and the environment information acquired by the state variable acquiring section 110 and the teaching data. The machine learning may be thereby performed by employing the four pieces of information, i.e., the feature information, the medium information, the first control information, and the additionally-included environment information as the state variables. It is therefore possible to obtain a desired learned model having further higher accuracy.

The environment information of the machine learning device 100 may include the information regarding the temperature and the humidity around the image forming apparatus 10. This allows the environment information to include the information regarding the temperature around the image forming apparatus 10 that influences a matter such as control of the fixing temperature of the image forming apparatus 10 and the information regarding the humidity around the image forming apparatus 10 that influences the matter such as a condition of the print medium. It is therefore possible to obtain the desired learned model having higher accuracy and being suitable for a situation at the time of printing.

The machine learning method described above may include step S22, step S13, and step S15, as illustrated in FIG. 5, for example. Step S22 may acquire, by a computer, the feature information, the medium information, the first control information, and the environment information as the state variables. The feature information is information regarding the feature of the actual printed matter AP on which printing has been actually performed by the image forming apparatus 10. The medium information is information regarding the print medium PM used in the actual printed matter AP. The first control information is information regarding control performed when the actual printed matter AP has been outputted. The environment information may be information regarding the environment around the image forming apparatus 10. Step S13 acquires the second control information as the teaching data. The second control information is information regarding control that causes the feature information to fall within the predetermined threshold. Step S15 may generate the learned model by performing the machine learning on the basis of the feature information, the medium information, the first control information, the environment information, and the teaching data. The machine learning may be thereby performed by employing the four pieces of information, i.e., the feature information, the medium information, the first control information, and the additionally-provided environment information as the state variables. It is therefore possible to obtain a desired learned model having further higher accuracy.

[Still Another Example Embodiment]

The medium information, i.e., the information regarding the print medium PM used in the actual printed matter AP, according to the example embodiment described above may include information regarding the presence or absence of coating, the material, the thickness, the weight, and the density of the print medium PM. This is, however, non-limiting. Alternatively, for example, the medium information of the print medium PM may include information regarding smoothness, volume resistivity, and surface resistivity of the print medium PM in addition to the presence or absence of coating, the material, the thickness, the weight, and the density of the print medium PM. It is possible to efficiently generate the learned model having higher accuracy by performing the machine learning on the basis of the eight types of medium information described above. The smoothness serving as the medium information may represent smoothness of a surface of the print medium PM. Non-limiting examples of the smoothness may include Bekk smoothness. As this is a non-limiting example, the smoothness may be of any type as long as the information regarding the smoothness includes information regarding projection and recession on the surface of the print medium PM. In one specific but non-limiting example, the information regarding the smoothness may be information obtained by scanning the surface of the print medium PM with use of a probe. The volume resistivity and the surface resistivity for the medium information may represent electrical resistance of the print medium PM, which may be a resistance value or a resistivity rate.

Description is given below of an influence, on printing quality, of the toner fixing temperature, the secondary transfer voltage, the smoothness of the print medium PM, the volume resistivity of the print medium PM, and the surface resistivity of the print medium PM.

Figure 6A:
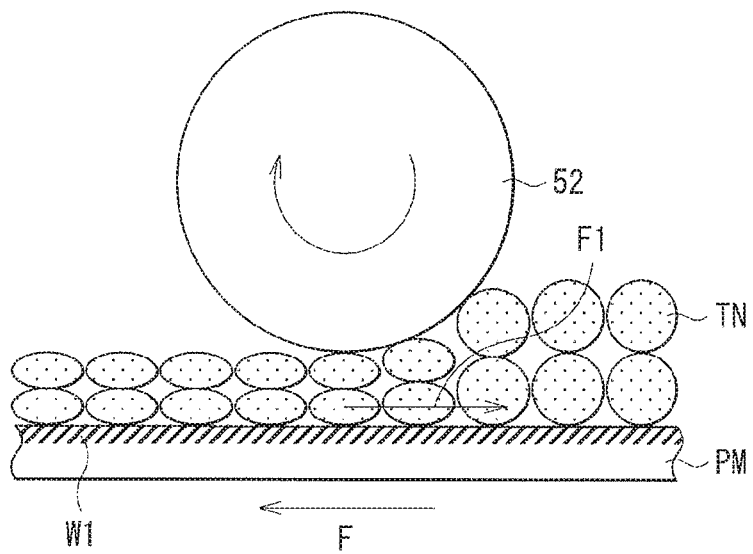
FIG. 6A is an explanatory diagram illustrating an example of a state of a toner on a print medium in the vicinity of a fixing section
Figure 6B:
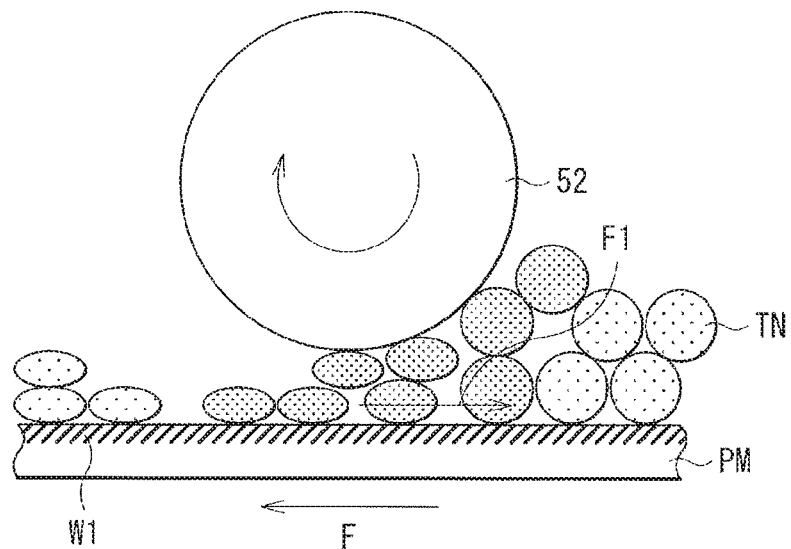
FIG. 6B is an explanatory diagram illustrating another example of the state of the toner on the print medium in the vicinity of the fixing section.

FIGS. 6A and 6B each illustrate a state of the toner TN present on the print medium PM in the vicinity of the fixing section 50. FIG. 6A illustrates a case where the toner fixing temperature is appropriate. FIG. 6B illustrates a case where the toner fixing temperature is low. The print medium PM may be conveyed toward the left, i.e., in the conveyance direction F, in FIGS. 6A and 6B. The print medium PM may be applied with predetermined fixing pressure since the pressure-applying roller 52 is biased toward the unillustrated fixing roller 51.

As illustrated in FIG. 6A, in the case where the toner fixing temperature is appropriate, the toner TN present on the print medium PM may be applied with pressure in a direction F1 as a result of fixing pressure in a gap between the pressure-applying roller 52 and the print medium PM. The direction F1 may be opposite to the conveyance direction F of the print medium PM. The toner TN may, however, remain at a position on the print medium PM where the toner TN has been transferred, without moving from the position. This may be a result of various types of resistance such as friction on the surface of the print medium PM in a portion W1 illustrated in FIG. 6A. The toner TN may be molten at the position by an amount of heat supplied from the unillustrated fixing roller 51 and thereby fixed to the position. This allows the toner TN to be fixed at the position where the toner TN has been transferred onto the print medium PM.

In contrast, as illustrated in FIG. 6B, in the case where the toner fixing temperature is low, the amount of heat supplied from the unillustrated fixing roller 51 may be insufficient, which causes a delay in melting of the toner TN. This may cause the toner TN to be stuck in the gap between the pressure-applying roller 52 and the print medium PM. The toner TN may be thereby shifted in the direction F1 from the position where the toner has been transferred on the print medium PM. The toner TN may be molten and fixed at a position to which the toner TN has been shifted. As a result, for example, a portion having an image with low density may be provided on the print medium PM. This may cause so-called registration displacement.

As described above, the toner fixing temperature can influence the printing quality. Accordingly, improvement in printing quality is expected by causing the first control information to include the toner fixing temperature.

Figure 7A:
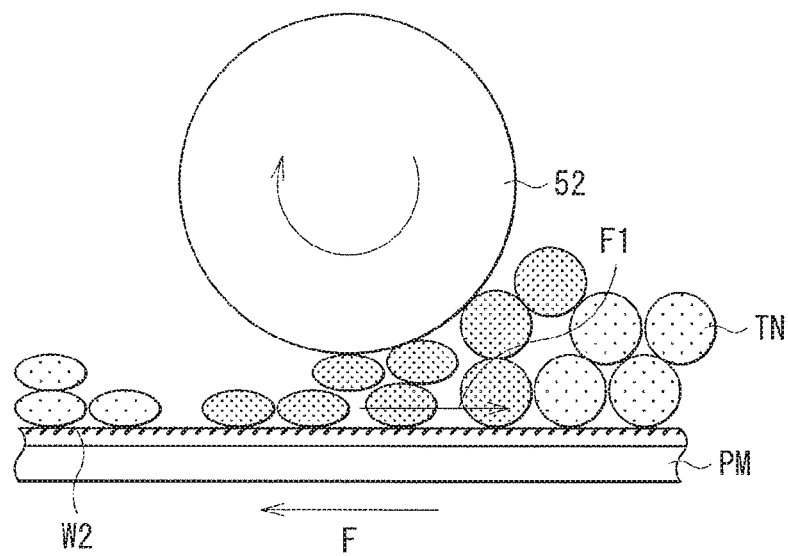
FIG. 7A is an explanatory diagram illustrating another example of the state of the toner on the print medium in the vicinity of the fixing section.
Figure 7B:
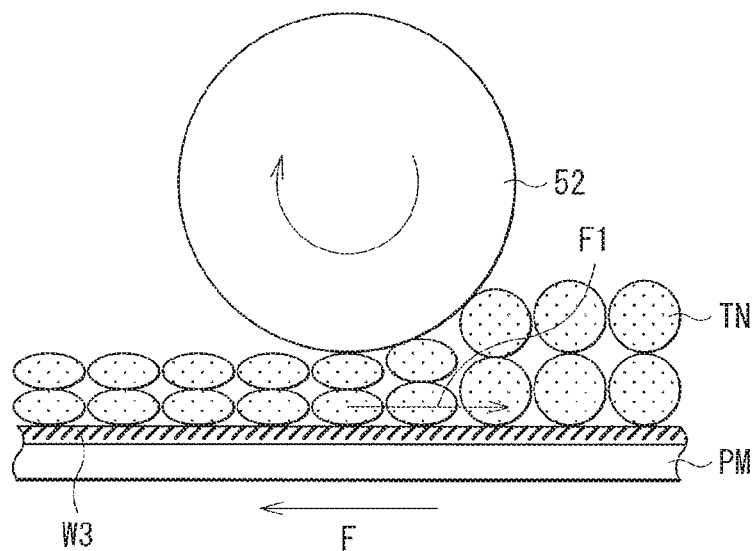
FIG. 7B is an explanatory diagram illustrating another example of the state of the toner on the print medium in the vicinity of the fixing section.

FIGS. 7A and 7B each illustrate a state of the toner TN present on the print medium PM in the vicinity of the fixing section 50. FIG. 7A illustrates a case where the print medium PM has high smoothness. FIG. 7B illustrates a case where the print medium PM has low smoothness.

In the example illustrated in FIG. 7A, the print medium PM may be coated paper. The surface of the print medium PM may be coated and may thereby have high smoothness. In this case, the surface of the print medium PM may be smooth, and therefore has small resistance in a portion W2 illustrated in FIG. 7A. Accordingly, the toner TN may be applied with pressure in the direction F1. The toner TN may be thereby shifted in the direction F1 from the position where the toner TN has been transferred onto the print medium PM. The toner TN may be molten and fixed at a position to which the toner TN has been shifted. That is, the presence of coating may cause the toner TN to be fixed at a position shifted from the position where the toner TN has been transferred onto the print medium PM in this case.

In the example illustrated in FIG. 7B, the print medium PM may be matt coated paper. The surface of the print medium PM may be so coated as to have less glossiness and may thereby have low smoothness. In this case, the surface of the print medium PM may be rough, and therefore have great resistance in a portion W3 illustrated in FIG. 7B. Accordingly, the toner TN may be molten at a position where the toner TN has been transferred onto the print medium PM without moving, and fixed at the position. In this case, the toner TN may be fixed at the position where the toner TN has been transferred onto the print medium PM also with the presence of coating, unlike the case illustrated in FIG. 7A.

As described above, the smoothness of the print medium PM can influence the printing quality. Accordingly, improvement in printing quality is expected by causing the medium information to include the information regarding the smoothness.

Figures 8A, 8B:
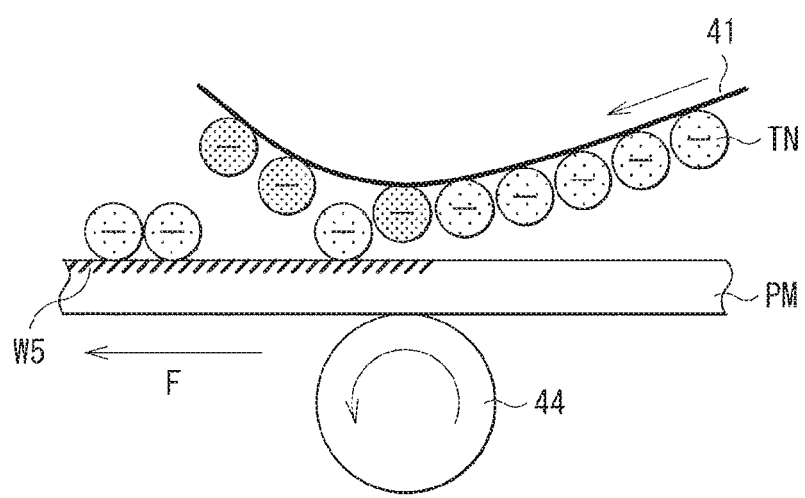
FIG. 8A is an explanatory diagram illustrating an example of the state of the toner on the print medium in the vicinity of a secondary transfer roller of a transfer section.
FIG. 8B is an explanatory diagram illustrating another example of the state of the toner on the print medium in the vicinity of the secondary transfer roller of the transfer section.

FIGS. 8A and 8B each illustrate a state of the toner TN present on the print medium PM in the vicinity of the secondary transfer roller 44 of the transfer section 40. FIG. 8A illustrates a case where the secondary transfer voltage is appropriate. FIG. 8B illustrates a case where the secondary transfer voltage is low. The print medium PM may be conveyed toward left in the FIGS. 8A and 8B, i.e., in the conveyance direction F. The intermediate transfer belt 41 may be circularly conveyed clockwise in FIG. 1. The toner adsorbed to the intermediate transfer belt 41 may be negatively charged. In contrast, the print medium PM may be positively charged by a voltage supplied from the secondary transfer roller 44.

As illustrated in FIG. 8A, in the case where the secondary transfer voltage is appropriate, the print medium PM may be positively charged sufficiently as in a portion W4 illustrated in FIG. 8A. The toner TN present on the intermediate transfer belt 41 may be attracted to the print medium PM by electrostatic force. The toner TN may be thereby transferred onto the print medium PM.

In contrast, as illustrated in FIG. 8B, in the case where the secondary transfer voltage is low, there is a possibility that the print medium PM is not positively charged sufficiently as in a portion W5 illustrated in FIG. 8B. In this case, a portion of the toner TN present on the intermediate transfer belt 41 may not be attracted to the print medium PM by electrostatic force and may remain on the intermediate transfer belt 41. As a result, for example, an image portion with no toner TN may be provided on the print medium PM. This may cause the faint color.

As described above, the secondary transfer voltage can influence the printing quality. Accordingly, improvement in printing quality is expected by causing the first control information to include information regarding the secondary transfer voltage.

FIG. 9 illustrates a state of the toner TN present on the print medium PM in the vicinity of the secondary transfer roller 44 of the transfer section 40 in a case where the print medium PM has low volume resistivity. It may be more difficult for the print medium PM to be positively charged in the case where the print medium PM has low volume resistivity as in a portion W6 illustrated in FIG. 9. In this case, a portion of the toner TN present on the intermediate transfer belt 41 may remain on the intermediate transfer belt 41, which may cause the faint color, as with the case illustrated in FIG. 8B. In the case where the print medium PM has low volume resistivity, the faint color may occur even when the secondary transfer voltage is appropriate, as described above.

As described above, the volume resistivity of the print medium PM can influence the printing quality. Accordingly, improvement in printing quality is expected by causing the medium information to include the volume density.

Figure 10:
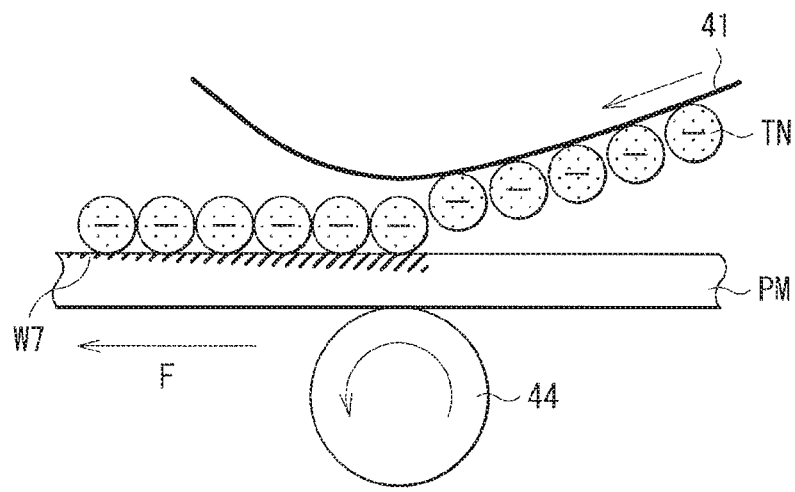
FIG. 10 is an explanatory diagram illustrating still another example of the state of the toner on the print medium in the vicinity of the secondary transfer roller of the transfer section.

FIG. 10 illustrates a state of the toner TN present on the print medium PM in the vicinity of the secondary transfer roller 44 of the transfer section 40 in a case where the print medium PM has low surface resistivity. Although the print medium PM is positively charged, it may be easier for the charging of the print medium PM to attenuate as the print medium PM is conveyed in the conveyance direction F as in a portion W7 illustrated in FIG. 10, in the case where the print medium PM has low surface resistivity. In this case, an amount of charge may decrease as the print medium PM is conveyed farther. It may be therefore more difficult to keep carrying the toner TN on the print medium PM. As a result, for example, the toner TN may be shifted in the direction F1, for example, in the fixing section 50, which may cause so-called registration displacement. As described above, the so-called registration displacement may occur even when the secondary transfer voltage is appropriate in the case where the print medium PM has low surface resistivity.

As described above, the surface resistivity of the print medium PM can influence the printing quality. Accordingly, improvement in printing quality is expected by causing the medium information to include the information regarding the surface resistivity.

As described above, the medium information of the machine learning device 100 may include the information regarding the presence or absence of coating, the material, the thickness, the weight, and the density, the smoothness, the volume resistivity, and the surface resistivity of the print medium PM. This allows for taking into consideration, at the time of the machine learning, various types of medium information regarding the print medium PM in addition to the thickness of the print medium PM. It is therefore possible to generate the learned model sufficiently taking into consideration the medium information.

[Data Processing System and Data Processing Method]

Figure 11:
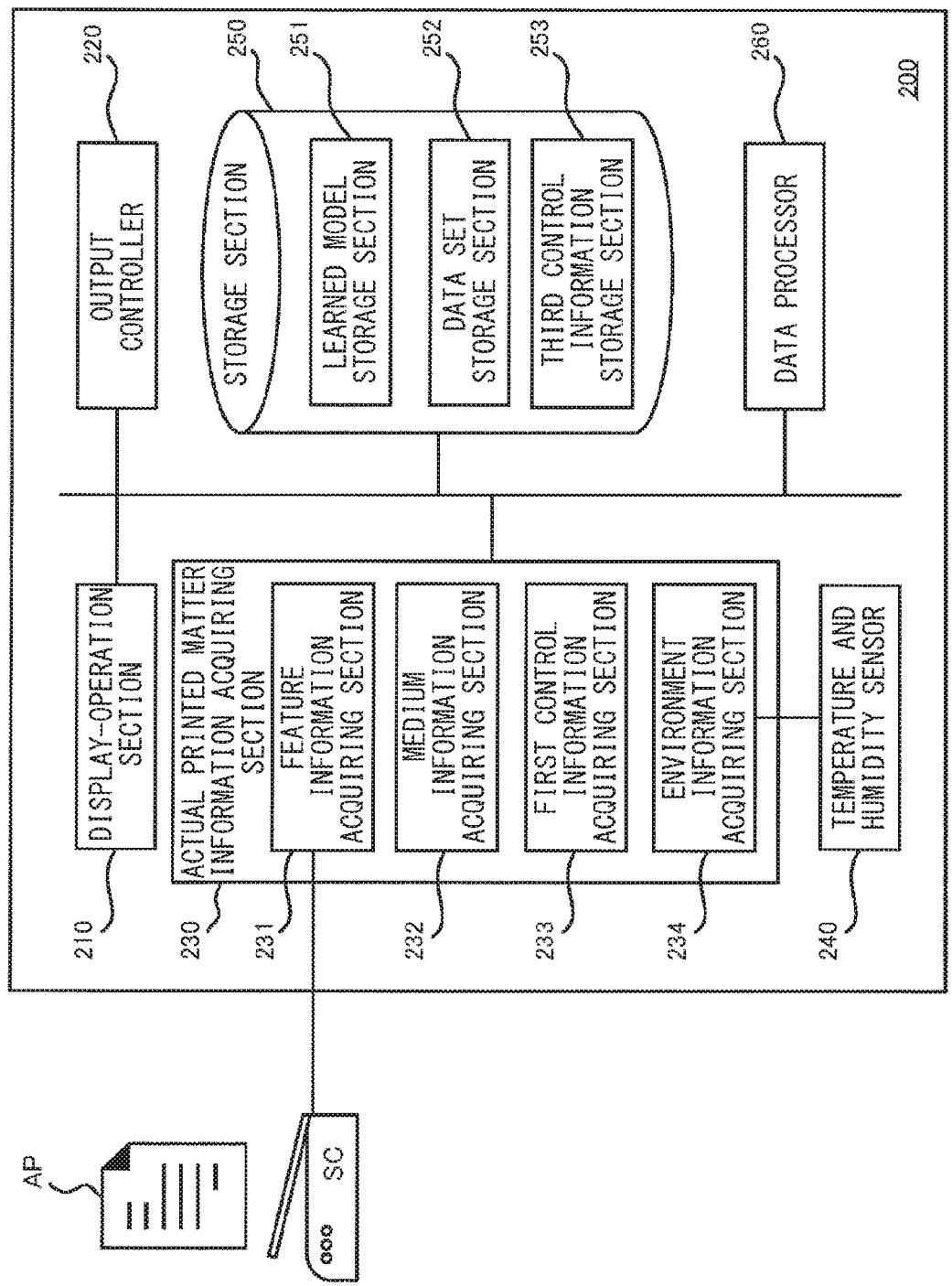
FIG. 11 is a schematic block diagram illustrating an example of a configuration of a data processing system according to one example embodiment of the technology.

Description is given next of an application example of the learned model generated by the machine learning apparatus and the machine learning method described above. FIG. 11 is a schematic block diagram illustrating a data processing system according to an example embodiment of the technology. The example embodiment is described below referring to a case where the learned model generated by the machine learning method according to the other example embodiment is applied to an image forming apparatus 200.

The image forming apparatus 200 according to the example embodiment may be a so-called full-color LED printer of the intermediate transfer type, as with that described with reference to FIG. 1. The image forming apparatus 200 may have a mechanical structure almost the same as that illustrated in FIG. 1. Accordingly, the reference numbers used for the image forming apparatus 10 are referred to in the description below on an as-needed basis on the assumption that, in particular, the mechanical structure of the image forming apparatus 200 is similar to that of the image forming apparatus 10. The image forming apparatus 200 may include a display-operation section 210, an output controller 220, an actual printed matter information acquiring section 230, a temperature and humidity sensor 240, a storage section 250, and a data processor 260, as illustrated in FIG. 11.

The display-operation section 210 may include a display device and an operation device. The display device may include, for example but not limited to, a liquid crystal panel provided at a predetermined position of the image forming apparatus 200. The operation device may include, for example but not limited to, an operation button or a touch panel. The display-operation section 210 may have a configuration directed to performing a predetermined notification with respect to a user of the image forming apparatus 200 or allowing the user to perform input operation. The output controller 220 may have a configuration directed to controlling various configurations that allow for printing output by the image forming apparatus 200. The output controller 220 may include, for example but not limited to, at least a CPU and a memory such as a random-access memory (RAM) or a read-only memory (ROM.) The control performed by the output controller 220 may include control of the secondary transfer voltage to be applied to the secondary transfer roller 44. The control performed by the output controller 220 may include control of the toner fixing temperature of the fixing roller 51, in more detail, a current value of a current to be supplied to the heater inside the fixing roller 51.

The actual printed matter information acquiring section 230 may have a configuration directed to acquiring the information related to the actual printed matter AP including the print defect. The actual printed matter information acquiring section 230 may include a feature information acquiring section 231, a medium information acquiring section 232, a first control information acquiring section 233, and an environment information acquiring section 234. The various pieces of information acquired by the actual printed matter information acquiring section 230 may be associated with each other as a single data set, and may be stored in a data set storage section 252 which will be described later.

The feature information acquiring section 231 may have a configuration directed to acquiring image data of the actual printed matter AP as the feature information. The feature information acquiring section 231 may be locally coupled to a scanner SC outside the image forming apparatus 200 via an unillustrated input-output interface, as illustrated in FIG. 11. The feature information acquiring section 231 may acquire, as the feature information, image data of the actual printed matter AP read by the scanner SC in this example. The medium information acquiring section 232 may have a configuration directed to acquiring the information regarding the print medium PM, in more detail, the information regarding the presence or absence of coating, the material, the thickness, the weight, and the density of the print medium PM. This is, however, non-limiting. The medium information acquiring section 232 may further acquire information regarding the smoothness, the volume resistivity, and the surface resistivity of the print medium PM in addition, for example. The above-described medium information may be acquired, for example, by causing the user to input a production code via the display-operation section 210. The production code may be provided in advance to the print medium PM. The density for the medium information may be able to be determined by calculation when values of the thickness and the weight, e.g., the basis weight, are determined. For this reason, it may not be always necessary to input the density.

The first control information acquiring section 233 may have a configuration directed to acquiring the first control information that is information regarding control performed when the actual printed matter AP has been outputted, in more detail, the secondary transfer voltage to be applied to the secondary transfer roller 44 and the toner fixing temperature of the fixing roller 51. The first control information may be acquired via an internal bus since the first control information may be stored in a memory of the output controller 220 or in the storage section 250 that holds the control information of the output controller 220. The environment information acquiring section 234 may have a configuration directed to acquiring environment information that is information regarding environment around the image forming apparatus 200, in more detail, a temperature and humidity around the image forming apparatus 200. The environment information may be able to be acquired by the temperature and humidity sensor 240 built in the image forming apparatus 200, for example.

The storage section 250 may be included in a storage region directed to storing various pieces of information in the image forming apparatus 200. The storage section 250 may include a learned model storage section 251, a data set storage section 252, and a third control information storage section 253. The learned model storage section 251 may hold the learned model generated by the machine learning method according to the other example embodiment described above. In other words, the learned model storage section 251 may hold the learned model generated by executing the machine learning with use of the four pieces of information, i.e., the feature information, the medium information, the first control information, and the environment information. The data set storage section 252 may hold the feature information, the medium information, the first control information, and the environment information all related to the common actual printed matter AP acquired by the actual printed matter information acquiring section 230, as a single data set. The third control information storage section 253 may hold the third control information outputted by a data processor 260 which will be described later.

The data processor 260 may use the data set related to a specific actual printed matter AP stored in the data set storage section 252 and the learned model stored in the learned model storage section 251. The data processor 260 may thereby input various pieces of information included in the data set into the input layer of the learned model. The data processor 260 may thereby output, to the output layer, the secondary transfer voltage to be applied to the secondary transfer roller 44 and the toner fixing temperature of the fixing roller 51 as predetermined control information, i.e., the third control information. The information regarding the secondary transfer voltage and the toner fixing temperature included in the third control information may allow for improvement of the print defect present on the actual printed matter AP. That is, the third control information may have been so adjusted by the data processor 260 as to obtain a desired printed matter by using the print medium PM used in the actual printed matter AP and performing printing output by the image forming apparatus 200 based on the third control information as the control parameter.

The learned model storage section 251 may correspond to a "storage section" in one specific but non-limiting embodiment of the technology. The actual printed matter information acquiring section 230 may correspond to an "actual printed matter information acquiring section" in one specific but non-limiting embodiment of the technology. The data processor 260 may correspond to a "data processor" in one specific but non-limiting embodiment of the technology. The third control information storage section 253 may correspond to a "control information storage section" in one specific but non-limiting embodiment of the technology. The display-operation section 210 may correspond to a "printing instruction section" in one specific but non-limiting embodiment of the technology.

Figure 12:
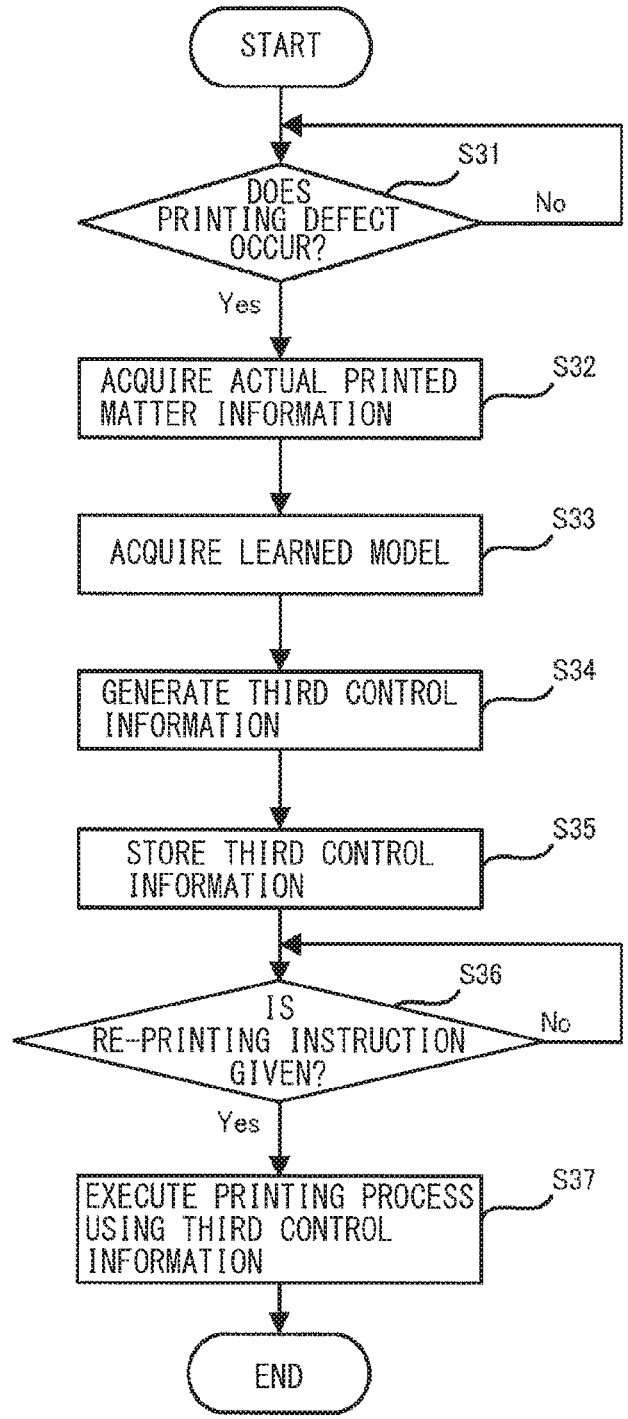
FIG. 12 is a flowchart illustrating an example of a data processing method to be executed in a data processing system illustrated in FIG. 11.

Description is given below, in relation to the data processing system described above, of a data processing method to be executed by the data processor 260, with reference to FIG. 12. FIG. 12 is a flowchart illustrating a data processing method to be executed by a data processor of a data processing system according to the example embodiment of the technology.

As illustrated in FIG. 12, the data processor 260 may maintain a standby state in a case where no print defect occurs (No in step S31.) The data processor 260 may perform the following data processing in a case where the print defect occurs (Yes in step S31.) Whether the print defect has occurred may be determined on the basis of declaration by the user. In one specific but non-limiting example, whether the print defect has occurred may be determined on the basis of whether declaration of a request to improve the print defect has been given, for example, via the display-operation section 210 of the image forming apparatus 200, a customer service that manages the image forming apparatus 200, or by any other way. In the example embodiment, various configurations may be built in the image forming apparatus 200 so that the print defect is solved solely by the image forming apparatus 200. In one example embodiment, a particular mode such as a print defect solving mode be provided to the image forming apparatus 200 in view of usability. In this case, the following processing directed to solving the print defect may be executed by selecting, by the user, the mode by means of the display-operation section 210.

When the print defect occurs, the image forming apparatus 200 may request the user to provide the actual printed matter information necessary to solve the print defect, via a predetermined user interface such as the display-operation section 210. In a specific but non-limiting example, the image forming apparatus 200 may request the user to perform, for example but not limited to, operation of inputting the medium information or operation of inputting the feature information of the actual printed matter AP by causing the scanner SC to read the actual printed matter AP with the print defect. The actual printed matter information acquiring section 230 may store the actual printed matter information inputted by the user on the basis of the above-described request, in the data set storage section 252 as a single data set. The data processor 260 may acquire the actual printed matter information by referring to the data set storage section 252 (step S32.) Upon requesting the user to provide the actual printed matter information, for example, a method of acquiring various pieces of information may be displayed on the display-operation section 210, or a navigation sound may be outputted via an unillustrated audio output device, thereby prompting the user to perform input operation of various pieces of information. The feature information regarding the actual printed matter AP with the print defect may be inputted in a case where the print defect occurs in the above-described example; however, this is non-limiting. In a specific but non-limiting example, printing may be performed again with use of control information that causes a greater print defect, and feature information regarding the actual printed matter with the greater print defect may be inputted.

When the requested actual printed matter information is inputted by the user, the data processor 260 may refer to the learned model storage section 251 and thereby acquire the learned model (step S33.) Thereafter, the data processor 260 may input the actual printed matter information acquired in step S32 into the input layer of the acquired learned model, and thereby generate the third control information as the output layer (step S34.)

When the third control information is generated, the data processor 260 may temporarily store the third control information in the third control information storage section 253 (step S35), and wait for a re-printing instruction to be given by the user (step S36.) When the re-printing instruction is given by the user, for example, through operation performed on the display-operation section 210, the output controller 220 may adjust the secondary transfer voltage to be applied to the secondary transfer roller 44 and the toner fixing temperature of the fixing roller 51 on the basis of the third control information stored in the third control information storage section 253 instead of the first control information, and thereafter execute the printing process again (step S37.)

The printed matter outputted as a result of the re-printing through the above-described processes may have been outputted on the basis of the third control information adjusted on the basis of a previous printing result. The print defect present on the actual printed matter AP outputted previously may be almost solved. As described above, the data processing system according to one embodiment of the technology does not require any human such as the engineer EN to work from occurrence of the print defect to acquisition by the user of the printed matter with the print defect solved. Accordingly, the data processing system according to one embodiment of the technology achieves data processing with suppressed cost. A printing result with the print defect being solved is obtainable in most of the printed matters that have been re-printed through the above-described series of processes. There is, however, still a slight possibility that the print defect occurs even after the above-described series of processes. The processes described in steps S32 to S37 may be executed again in such a case.

In addition, an information acquiring method of each configuration of the actual printed matter information acquiring section 230 described above is not limited to the method described above. In a specific but non-limiting example, the feature information acquiring section 231 may acquire the feature information by receiving, for example but not limited to, via the Internet, the image data of the actual printed matter AP read by means of an imaging device other than the scanner. Non-limiting examples of the imaging device other than the scanner may include a camera device built in a smartphone, and an image acquisition sensor provided at a location such as a discharging slot of the image forming apparatus. In a specific but non-limiting example, the medium information acquiring section 232 may acquire the medium information by a method such as automatically acquiring the medium information inside the image forming apparatus 200. Such automatic acquisition of the medium information may be performed by causing a user to input, instead of the production code of the print medium PM, information acquired by actual measurement or any other information through an interactive process, by means of the display-operation section 210 or a predetermined application. Such automatic acquisition of the medium information may be performed also by providing the image forming apparatus 200 with various sensors directed to acquiring the medium information regarding the print medium PM. In a specific but non-limiting example, the environment information acquiring section 234 may acquire the environment information by acquiring an output from a temperature and humidity sensor provided separately outside the image forming apparatus 200 instead of the temperature and humidity sensor 240 built in the image forming apparatus 200. In another specific but non-limiting example, the environment information acquiring section 234 may acquire the environment information by acquiring temperature and humidity information through input operation performed by the user.

The example embodiment has been described above referring to the image forming apparatus 200 including the environment information acquiring section 234 and the temperature and humidity sensor 240. In one example embodiment, however, the environment information acquiring section 234 and the temperature and humidity sensor 240 may not be provided. In this case, only three pieces of information, i.e., the feature information, the medium information, and the first control information, may be acquired by the actual printed matter information acquiring section 230. In accordance therewith, the learned model generated by the machine learning method according to the example embodiment described above may be stored in the learned model storage section 251. In other words, the learned model obtained by executing the machine learning using the three pieces of information, the feature information, the medium information, and the first control information as the state variables may be stored in the learned model storage section 251. The above-described learned model may be acquired by the data processor 260. The necessity of the above shall be clearly understood by a person in the art.

Moreover, the example embodiment has been described above referring to an example where the image forming apparatus included in the data processing system may be the full-color LED printer of the intermediate transfer type. In one example embodiment, however, the image forming apparatus may be a digital multifunction peripheral further provided with another function such as a scanner function or a facsimile function other than the printer function. In this case, the digital multifunction peripheral itself may have the scanner function. It may be therefore unnecessary to use the above-described scanner SC provided outside upon acquiring the feature information. Accordingly, the data processing system according to the example embodiment may be provided also with the use of a completely-offline digital multifunction peripheral.

As described above, the data processing system includes the actual printed matter information acquiring section 230, the data processor 260, and the third control information storage section 253, as illustrated in FIG. 11, for example. The actual printed matter information acquiring section 230 acquires the feature information, the medium information, and the first control information. The feature information is the information regarding the feature of the actual printed matter AP on which printing has been actually performed by the image forming apparatus 200. The medium information is the information regarding the print medium PM used in the actual printed matter AP. The first control information is the information regarding control performed by the image forming apparatus 200 when the actual printed matter AP has been outputted. The data processor 260 inputs the feature information, the medium information, and the first control information acquired by the actual printed matter information acquiring section 230 into the learned model generated by the machine learning device 100 described above, and outputs the third control information. The third control information storage section 253 holds the third control information outputted by the data processor 260. Using the learned model as described above allows for automatic adjustment of the control information without adjustment by the engineer EN. It is therefore possible to achieve the data processing that is able to solve the print defect occurring on the actual printed matter AP at lower cost and with higher accuracy.

The data processing system includes the actual printed matter information acquiring section 230, the data processor 260, and the third control information storage section 253, as illustrated in FIG. 11, for example. The actual printed matter information acquiring section 230 may acquire the feature information, the medium information, the first control information, and the environment information. The feature information is the information regarding the feature of the actual printed matter AP on which printing has been actually performed by the image forming apparatus 200. The medium information is the information regarding the print medium PM used in the actual printed matter AP. The first control information is the information regarding control performed by the image forming apparatus 200 when the actual printed matter AP has been outputted. The environment information may be the information regarding the environment around the image forming apparatus 200. The data processor 260 may input the feature information, the medium information, the first control information, and the environment information acquired by the actual printed matter information acquiring section 230 into the learned model generated by the machine learning device 100 described above, and output the third control information. The third control information storage section 253 holds the third control information outputted by the data processor 260. Using the learned model as described above allows for automatic adjustment of the control information without adjustment by the engineer EN. It is therefore possible to achieve the data processing that is able to solve the print defect occurring on the actual printed matter AP at lower cost and with further higher accuracy.

As described above, the data processing method includes step S32, step S34, and step S35, as illustrated in FIG. 12, for example. Step S32 acquires, by the computer, the feature information, the medium information, and the first control information. The feature information is information regarding the feature of the actual printed matter AP on which printing has been actually performed by the image forming apparatus 200. The medium information is information regarding the print medium PM used in the actual printed matter AP. The first control information is information regarding control performed by the image forming apparatus 200 when the actual printed matter AP has been outputted. Step S34 inputs, by the computer, the acquired feature information, the acquired medium information, and the acquired first control information into the learned model generated by the above-described machine learning method, and outputs, by the computer, the third control information. Step S35 stores, by the computer, the outputted third control information. Using the learned model as described above allows for automatic adjustment of the control information without adjustment by the engineer EN. It is therefore possible to achieve the data processing that is able to solve the print defect occurring on the actual printed matter AP at lower cost and with higher accuracy.

Further, the data processing method may include step S32, step S34, and step S35 described below, as illustrated in FIG. 12, for example. Step S32 may acquire, by the computer, the feature information, the medium information, the first control information, and the environment information. The feature information is information regarding the feature of the actual printed matter AP on which printing has been actually performed by the image forming apparatus 200. The medium information is information regarding the print medium PM used in the actual printed matter AP. The first control information is information regarding control performed by the image forming apparatus 200 when the actual printed matter AP has been outputted. The environment information may be information regarding the environment around the image forming apparatus 200. Step S34 may input, by the computer, the acquired feature information, the acquired medium information, the acquired first control information, and the acquired environment information into the learned model generated by the above-described machine learning method, and outputs, by the computer, the third control information. Step S35 stores the outputted third control information. Using the learned model as described above allows for automatic adjustment of the control information without adjustment by the engineer EN. It is therefore possible to achieve the data processing that is able to solve the print defect occurring on the actual printed matter AP at lower cost and with further higher accuracy.

[Another Example Embodiment]

The image forming apparatus 200 serving as the data processing system according to the example embodiment described above may include the learned model storage section 251 inside the image forming apparatus 200, and almost all of the data processing directed to solving the print defect may be executed inside the image forming apparatus 200. One embodiment of the technology is, however, not limited thereto. Description is given below of another example embodiment that executes a series of data processing outside an image forming apparatus. The description of the other example embodiment below is given only for a portion different from the data processing system according to the example embodiment described above, and further description is not provided of a common configuration, a common operation, etc.

Figure 13:
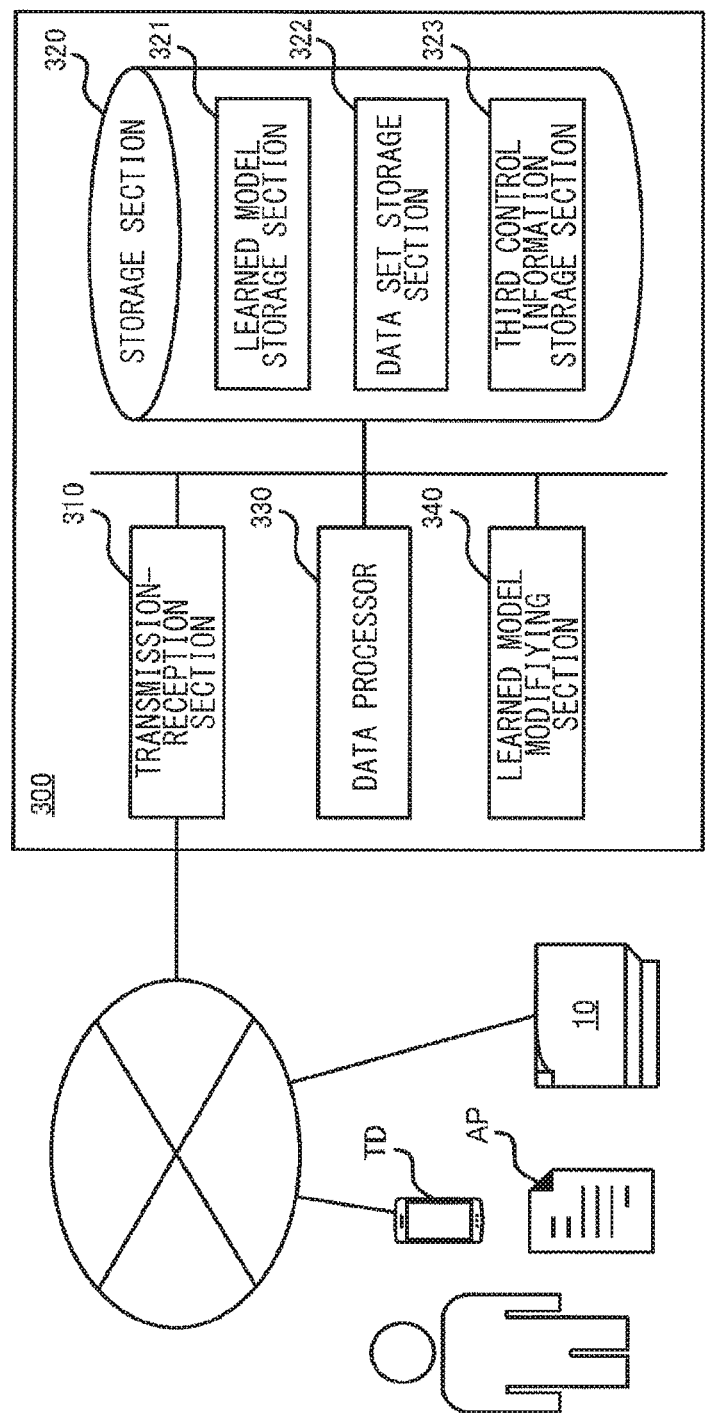
FIG. 13 is a schematic block diagram illustrating an example of a configuration of a data processing system according to one example embodiment.

FIG. 13 is a schematic block diagram illustrating the data processing system according to the other example embodiment of the technology. The data processing system according to the other example embodiment may include a server device 300 coupled to the Internet, as illustrated in FIG. 13. The server device 300 may be coupled to a plurality of terminal devices TD and the image forming apparatus 10 via the Internet. Non-limiting examples of the terminal device TD may include a smartphone, a tablet terminal, and a PC.

The server device 300 may include a transmission-reception section 310, a storage section 320, a data processor 330, and a learned model modifying section 340. The transmission-reception section 310 may acquire the actual printed matter information and feedback information transmitted from the terminal device TD, the image forming apparatus 10, or both. The transmission-reception section 310 may transmit the third control information which will be described later to the terminal device TD, the image forming apparatus 10, or both. The actual printed matter information may be transmitted to the transmission-reception section 310 by various methods. In a non-limiting example, the feature information and the medium information may be transmitted via an application installed in advance in the terminal device TD. The first control information, or the first control information and the environment information may be transmitted by the image forming apparatus 10 that operates when triggered by operation of the application in the terminal device TD, in one non-limiting example. The third control information may be transmitted by the transmission-reception section 310 to the image forming apparatus 10, to thereby reflect the third control information to the image forming apparatus 10. In another non-limiting example, the third control information may be transmitted by the transmission-reception section 310 to the terminal device TD, and the user may input the information received by the terminal device TD into the image forming apparatus 10 to thereby reflect the third control information to the image forming apparatus 10.

The storage section 320 may be included in a storage region directed to storing various pieces of information in the server device 300. The storage section 320 may include a learned model storage section 321, a data set storage section 322, and a third control information storage section 323. The learned model storage section 321 may hold a plurality of learned models so as to be applicable to various types of actual printed matter information and various types of image forming apparatuses. In one example embodiment, the learned models may be prepared in correspondence with types of image forming apparatus so as to be applicable to a plurality of types of image forming apparatuses having different printing method, different types of operation, etc. The data set storage section 322 may hold, as a single data set, the feature information, the medium information, and the first control information that are related to the common actual printed matter AP and received by the transmission-reception section 310. The data set storage section 322 may further hold the environment information in addition as the single data set. The third control information storage section 323 may hold the third control information outputted by a data processor 330 described below.

The data processor 330 may use a particular data set and a single learned model. The above-described particular data set may have been transmitted via the transmission-reception section 310 and stored in the data set storage section 322. The above-described single leaned model may be one, of the teamed models stored in the teamed model storage section 251, that has been determined on the basis of the content of the data set, the type of the image forming apparatus, or any other suitable factor. The data processor 330 may input various pieces of information included in the data set into the input layer of the learned model. The data processor 330 may thereby output the transfer voltage and the toner fixing temperature as predetermined control information, i.e., the third control information.

The learned model modifying section 340 may be directed to so modifying, on the basis of the feedback information received by the transmission-reception section 310, the corresponding learned model in the learned model storage section 321 that the learned model has higher accuracy. The feedback information may be transmitted from the terminal device TD, the image forming apparatus 10, or both, for example, in a case where the print defect is not improved or another print defect occurs as a result of re-printing based on the third control information outputted by the data processor 330. The learned model modifying section 340 may use the feedback information as a data set directed to learning with respect to the corresponding learned model. The learned model modifying section 340 may be thereby able to also modify anytime the learned model temporarily stored in the learned model storage section 321.

The data processing method to be performed by the server device 300 according to the other example embodiment maybe almost similar to the method illustrated in FIG. 12 except that communication via the Internet is used, for example, upon acquisition of the actual printed matter information or upon application of the third control information. Description thereof is therefore not given further.

Since the data processing is achieved by the server device 300 in the data processing system according to the other example embodiment as described above, the data processing system may be easily applicable to an existing image forming apparatus. Further, since the server device 300 may include the learned model modifying section 340, it is possible to update the learned model anytime, which makes it possible to improve accuracy of the data processing all the time or most of the time. It is therefore possible to provide an optimum data processing result all the time or most of the time.

The data processing system according to the other example embodiment has been described as having the single server device 300. This is, however, merely for description purpose, and the number of the server devices is not limited. In one example embodiment, the data processing system may be provided in a form of a cloud service.

As described above, the data processing system includes the actual printed matter information acquiring section, i.e., the transmission-reception section 310, the data processor 330, and the third control information storage section 323, as illustrated in FIG. 13, for example. The actual printed matter information acquiring section, i.e., the transmission-reception section 310, acquires the feature information, the medium information, and the first control information. The feature information is information regarding the feature of the actual printed matter AP on which printing has been actually performed by the image forming apparatus 10. The medium information is information regarding the print medium PM used in the actual printed matter AP. The first control information is information regarding control performed by the image forming apparatus 10 when the actual printed matter AP has been outputted. The data processor 330 inputs the feature information, the medium information, and the first control information acquired by the actual printed matter information acquiring section into the learned model generated by the machine learning device 100 described above, and outputs the third control information. The third control information storage section 323 holds the third control information outputted by the data processor 330. Using the learned model as described above allows for automatic adjustment of the control information without adjustment by the engineer EN. It is therefore possible to achieve data processing that is able to solve the print defect occurring on the actual printed matter AP at lower cost and with higher accuracy.

The data processing system includes the actual printed matter information acquiring section, i.e., the transmission-reception section 310, the data processor 330, and the third control information storage section 323, as illustrated in FIG. 13, for example. The actual printed matter information acquiring section, i.e., the transmission-reception section 310, may acquire the feature information, the medium information, the first control information, and the environment information. The feature information is information regarding the feature of the actual printed matter AP on which printing has been actually performed by the image forming apparatus 10. The medium information is information regarding the print medium PM used in the actual printed matter AP. The first control information is information regarding control performed by the image forming apparatus 10 when the actual printed matter AP has been outputted. The environment information may be information regarding the environment around the image forming apparatus 10. The data processor 330 may input the feature information, the medium information, the first control information, and the environment information acquired by the actual printed matter information acquiring section into the learned model generated by the machine learning device 100 described above, and outputs the third control information. The third control information storage section 323 holds the third control information outputted by the data processor 330. Using the learned model as described above allows for automatic adjustment of the control information without adjustment by the engineer EN. It is therefore possible to achieve data processing that is able to solve the print defect occurring on the actual printed matter AP at lower cost and with further higher accuracy.

One embodiment of the technology is not limited to the example embodiments described above. The embodiment of the technology is implementable by being modified in a variety of ways in a range not departing from the gist of the technology, which are all included in the technical idea of the technology.

Furthermore, the technology encompasses any possible combination of some or all of the various embodiments and the modifications described herein and incorporated herein. It is possible to achieve at least the following configurations from the above-described example embodiments of the technology.

(1)

A machine learning device including:

a state variable acquiring section that acquires feature information, medium information, and first control information as state variables, the feature information being information regarding a feature of an actual printed matter on which printing has been actually performed by an image forming apparatus, the medium information being information regarding a print medium used in the actual printed matter, the first control information being information regarding control performed when the actual printed matter has been outputted;

a teaching data acquiring section that acquires second control information as teaching data, the second control information being information regarding control that causes the feature information to fall within a predetermined threshold; and a learned model generating section that generates a learned model by performing machine learning on the basis of the feature information, the medium information, and the first control information acquired by the state variable acquiring section and the teaching data.

(2)

The machine learning device according to (1), in which the feature information includes information regarding a print defect on the actual printed matter.

(3)

The machine learning device according to (1) or (2), in which the medium information includes information regarding presence or absence of coating, a material, a thickness, a weight, and a density of the print medium.

(4)

The machine learning device according to (3), in which the medium information further includes information regarding smoothness, volume resistivity, and surface resistivity of the print medium.

(5)

The machine learning device according to any one of (1) to (4), in which the image forming apparatus includes an electrophotographic image forming apparatus, and the first control information includes information regarding a toner fixing temperature and a transfer voltage of the image forming apparatus.

(6)

The machine learning device according to any one of (1) to (5), in which the image forming apparatus includes an electrophotographic image forming apparatus, and the second control information includes information regarding a toner fixing temperature and a transfer voltage of the image forming apparatus.

(7)

The machine learning device according to any one of (1) to (6), in which the state variable acquiring section further acquires environment information as the state variables, the environment information being information regarding an environment around the image forming apparatus.

(8)

The machine learning device according to (7), in which the environment information includes information regarding a temperature and humidity around the image forming apparatus.

(9)

A data processing system including:

an actual printed matter information acquiring section that acquires feature information, medium information, and first control information, the feature information being information regarding a feature of an actual printed matter on which printing has been actually performed by an image forming apparatus, the medium information being information regarding a print medium used in the actual printed matter, the first control information being information regarding control performed by the image forming apparatus when the actual printed matter has been outputted;

a data processor that inputs the feature information, the medium information, and the first control information acquired by the actual printed matter information acquiring section into a learned model generated by the machine learning device according to any one of (1) to (6), thereby generates third control information, and outputs the third control information; and a control information storage section that holds the third control information outputted by the data processor.

(10)

A data processing system including:

an actual printed matter information acquiring section that acquires feature information, medium information, first control information, and environment information, the feature information being information regarding a feature of an actual printed matter on which printing has been actually performed by an image forming apparatus, the medium information being information regarding a print medium used in the actual printed matter, the first control information being information regarding control performed by the image forming apparatus when the actual printed matter has been outputted, the environment information being information regarding an environment around the image forming apparatus;

a data processor that inputs the feature information, the medium information, the first control information, and the environment information acquired by the actual printed matter information acquiring section into a learned model generated by the machine learning device according to (7) or (8), thereby generates third control information, and outputs the third control information; and a control information storage section that holds the third control information outputted by the data processor.

(11)

A printing system including:

a storage section that holds a learned model generated by performing machine learning on the basis of feature information, medium information, first control information, and teaching data, the feature information being information regarding a feature of an actual printed matter on which printing has been actually performed by an image forming apparatus, the medium information being information regarding a print medium used in the actual printed matter, the first control information being information regarding control performed by the image forming apparatus when the actual printed matter has been outputted, the teaching data being second control information that is information regarding control causing the feature information to fall within a predetermined threshold;

an actual printed matter information acquiring section that acquires actual printed matter information including the medium information of a print medium to be used:

a data processor that inputs the actual printed matter information into the learned model, thereby generates third control information, and outputs the third control information: and a printing instruction section that gives, on the basis of user operation, a printing instruction to perform printing on the print medium to be used, the printing instruction section giving the printing instruction with use of the third control information outputted by the data processor.

(12)

A machine learning method including:

performing, by a computer, a first process that acquires feature information, medium information, and first control information as state variables, the feature information being information regarding a feature of an actual printed matter on which printing has been actually performed by an image forming apparatus, the medium information being information regarding a print medium used in the actual printed matter, the first control information being information regarding control performed when the actual printed matter has been outputted;

performing, by the computer, a second process that acquires second control information as teaching data, the second control information being information regarding control that causes the feature information to fall within a predetermined threshold; and performing, by the computer, a third process that generates a learned model by performing machine learning on the basis of the feature information, the medium information, the first control information, and the teaching data.

(13)

The machine learning method according to (12), in which the first process further acquires environment information as the state variables, the environment information being information regarding an environment around the image forming apparatus, and the third process performs the machine learning also on the basis of the environment information.

(14)

A data processing method including:

performing, by a computer, first data processing that acquires feature information, medium information, and first control information, the feature information being information regarding a feature of an actual printed matter on which printing has been actually performed by an image forming apparatus, the medium information being information regarding a print medium used in the actual printed matter, the first control information being information regarding control performed by the image forming apparatus when the actual printed matter has been outputted;

performing, by the computer, second data processing that inputs the acquired feature information, the acquired medium information, and the acquired first control information into a learned model, thereby generates third control information, and outputs the third control information, the learned model being generated by the machine learning method according to (12); and performing, by the computer, third data processing that stores the outputted third control information.

(15)

A data processing method including:

performing, by a computer, first data processing that acquires feature information, medium information, first control information, and environment information, the feature information being information regarding a feature of an actual printed matter on which printing has been actually performed by an image forming apparatus, the medium information being information regarding a print medium used in the actual printed matter, the first control information being information regarding control performed by the image forming apparatus when the actual printed matter has been outputted, the environment information being information regarding an environment around the image forming apparatus;

performing, by the computer, second data processing that inputs the acquired feature information, the acquired medium information, the acquired first control information, and the acquired environment information into a learned model, thereby generates third control information, and outputs the third control information, the learned model being generated by the machine learning method according to (13); and performing, by the computer, third data processing that stores the outputted third control information.

According to each of the machine learning device and the machine learning method of one embodiment of the technology, the machine learning is performed on the basis of the feature information, the media information, the first control information, and the teaching data. It is therefore possible to improve printing quality.

According to the printing system of one embodiment of the technology, the third control information is generated by inputting the actual printed matter information into the learned model generated by performing the machine learning on the basis of the feature information, the medium information, the first control information, and the teaching data. Further, the printing instruction is given to perform printing on the print medium to be used with use of the third control information on the basis of the user operation. It is therefore possible to improve printing quality.

According to each of the data processing system and the data processing method of one embodiment of the technology, the third control information is outputted by inputting the feature information, the medium information, and the first control information into the learned model generated by the machine learning device or the machine learning method described above. It is therefore possible to improve printing quality.

Although the technology has been described in terms of exemplary embodiments, it is not limited thereto. It should be appreciated that variations may be made in the described embodiments by persons skilled in the art without departing from the scope of the invention as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. A machine learning device comprising:
a processor configured to:
acquire feature information, medium information, and first control information as state variables, the feature information being information regarding a feature of an actual printed matter on which printing has been actually performed by an image forming apparatus, the medium information being information regarding a print medium used in the actual printed matter, the first control information being information regarding control performed when the actual printed matter has been outputted;
acquire second control information as teaching data, the second control information being information that allows a printing result to be achieved that is free from a print defect; and
generate a learned model by performing machine learning on a basis of the feature information, the medium information, the first control information, and the teaching data.

2. The machine learning device according to claim 1, wherein the feature information includes information regarding the print defect on the actual printed matter.

3. The machine learning device according to claim 1, wherein the medium information includes information regarding presence or absence of coating, a material, a thickness, a weight, and a density of the print medium.

4. The machine learning device according to claim 3, wherein the medium information further includes information regarding smoothness, volume resistivity, and surface resistivity of the print medium.

5. The machine learning device according to claim 1, wherein
the image forming apparatus comprises an electrophotographic image forming apparatus, and
the first control information includes information regarding a toner fixing temperature and a transfer voltage of the image forming apparatus.

6. The machine learning device according to claim 1, wherein
the image forming apparatus comprises an electrophotographic image forming apparatus, and
the second control information includes information regarding a toner fixing temperature and a transfer voltage of the image forming apparatus.

7. The machine learning device according to claim 1, wherein the processor is further configured to acquire environment information as the state variables, the environment information being information regarding an environment around the image forming apparatus.

8. The machine learning device according to claim 7, wherein the environment information includes information regarding a temperature and humidity around the image forming apparatus.

9. A data processing system comprising:
a processor configured to acquire feature information, medium information, and first control information, the feature information being information regarding a feature of an actual printed matter on which printing has been actually performed by an image forming apparatus, the medium information being information regarding a print medium used in the actual printed matter, the first control information being information regarding control performed by the image forming apparatus when the actual printed matter has been outputted;
a data processor configured to input the feature information, the medium information, and the first control information acquired by the processor into a learned model generated by the machine learning device according to claim 1, thereby generating third control information, and outputting the third control information; and
a storage configured to store the third control information outputted by the data processor.

10. A data processing system comprising:
a processor configured to acquire feature information, medium information, first control information, and environment information, the feature information being information regarding a feature of an actual printed matter on which printing has been actually performed by an image forming apparatus, the medium information being information regarding a print medium used in the actual printed matter, the first control information being information regarding control performed by the image forming apparatus when the actual printed matter has been outputted, the environment information being information regarding an environment around the image forming apparatus;

a data processor configured to input the feature information, the medium information, the first control information, and the environment information acquired by the processor into a learned model generated by the machine learning device according to claim 7, thereby generating third control information, and outputting the third control information; and a storage configured to store the third control information outputted by the data processor.

11. A printing system comprising:

a storage configured to hold a learned model generated by performing machine learning on a basis of feature information, medium information, first control information, and teaching data, the feature information being information regarding a feature of an actual printed matter on which printing has been actually performed by an image forming apparatus, the medium information being information regarding a print medium used in the actual printed matter, the first control information being information regarding control performed by the image forming apparatus when the actual printed matter has been outputted, the teaching data being second control information that allows a printing result to be achieved that is free from a print defect;

a processor configured to acquire actual printed matter information including the medium information of a print medium to be used;

a data processor configured to input the actual printed matter information into the learned model, thereby generating third control information, and outputting the third control information; and a user interface configured to give, on a basis of user operation, a printing instruction to perform printing on the print medium to be used, the user interface being configured to give the printing instruction with use of the third control information outputted by the data processor.

12. A machine learning method comprising:

performing, by a computer, a first process that acquires feature information, medium information, and first control information as state variables, the feature information being information regarding a feature of an actual printed matter on which printing has been actually performed by an image forming apparatus, the medium information being information regarding a print medium used in the actual printed matter, the first control information being information regarding control performed when the actual printed matter has been outputted;

performing, by the computer, a second process that acquires second control information as teaching data, the second control information being information that allows a printing result to be achieved that is free from a print defect; and performing, by the computer, a third process that generates a learned model by performing machine learning on a basis of the feature information, the medium information, the first control information, and the teaching data.

13. The machine learning method according to claim 12, wherein the first process further acquires environment information as the state variables, the environment information being information regarding an environment around the image forming apparatus, and the third process performs the machine learning also on a basis of the environment information.

14. A data processing method comprising:

performing, by a computer, first data processing that acquires feature information, medium information, and first control information, the feature information being information regarding a feature of an actual printed matter on which printing has been actually performed by an image forming apparatus, the medium information being information regarding a print medium used in the actual printed matter, the first control information being information regarding control performed by the image forming apparatus when the actual printed matter has been outputted;

performing, by the computer, second data processing that inputs the acquired feature information, the acquired medium information, and the acquired first control information into a learned model, thereby generates third control information, and outputs the third control information, the learned model being generated by the machine learning method according to claim 12; and performing, by the computer, third data processing that stores the outputted third control information.

15. A data processing method comprising:

performing, by a computer, first data processing that acquires feature information, medium information, first control information, and environment information, the feature information being information regarding a feature of an actual printed matter on which printing has been actually performed by an image forming apparatus, the medium information being information regarding a print medium used in the actual printed matter, the first control information being information regarding control performed by the image forming apparatus when the actual printed matter has been outputted, the environment information being information regarding an environment around the image forming apparatus;

performing, by the computer, second data processing that inputs the acquired feature information, the acquired medium information, the acquired first control information, and the acquired environment information into a learned model, thereby generates third control information, and outputs the third control information, the learned model being generated by the machine learning method according to claim 13; and performing, by the computer, third data processing that stores the outputted third control information.

* * * * *